US012134553B2

(12) United States Patent
Nini

(10) Patent No.: US 12,134,553 B2
(45) Date of Patent: Nov. 5, 2024

(54) TAMPER-PREVENTING LIQUID DISPENSING TAP WITH AUTOMATIC OPENING

(71) Applicant: Vitop Moulding S.R.L., Alessandria (IT)

(72) Inventor: Diego Nini, Alessandria (IT)

(73) Assignee: VITOP MOULDING S.R.L., Alessandria (IT)

( * ) Notice: Subject to any disclaimer, the term of this patent is extended or adjusted under 35 U.S.C. 154(b) by 0 days.

(21) Appl. No.: 17/778,698

(22) PCT Filed: Nov. 11, 2020

(86) PCT No.: PCT/IT2020/050277

§ 371 (c)(1),
(2) Date: May 20, 2022

(87) PCT Pub. No.: WO2021/111480

PCT Pub. Date: Jun. 10, 2021

(65) Prior Publication Data

US 2022/0411252 A1 Dec. 29, 2022

(30) Foreign Application Priority Data

Dec. 3, 2019 (IT) ........................ 102019000022887

(51) Int. Cl.
*B67D 3/00* (2006.01)
*B67D 3/04* (2006.01)

(52) U.S. Cl.
CPC ........... *B67D 3/043* (2013.01); *B67D 3/0074* (2013.01); *B67D 3/045* (2013.01)

(58) Field of Classification Search
CPC ....... B67D 3/043; B67D 3/0074; B67D 3/045
See application file for complete search history.

(56) References Cited

U.S. PATENT DOCUMENTS

| | | | | |
|---|---|---|---|---|
| 6,401,982 | B1 * | 6/2002 | Grittmann ................ | B67D 3/04 251/351 |
| 9,604,836 | B2 * | 3/2017 | Nini ........................ | B65D 47/38 |
| 10,604,401 | B2 * | 3/2020 | Nini ........................ | B67D 3/043 |

FOREIGN PATENT DOCUMENTS

| | | | |
|---|---|---|---|
| EP | 0432070 | A1 | 6/1991 |
| EP | 1627850 | A1 | 2/2006 |

(Continued)

*Primary Examiner* — Frederick C Nicolas
(74) *Attorney, Agent, or Firm* — UB Greensfelder LLP; John X. Garred

(57) ABSTRACT

A tamper-preventing liquid-dispensing tap (1, 1B) with automatic opening includes a first body (4, 4B) having a removal-preventing and tamper-preventing element with sharped edge (4.5, 4B.5); an internal valve or membrane with elastic dome (5) contained in the first body (4); a second driving element (3) contained in and operatively coupled with the valve or membrane (5); and a cap (2, 2B) having integrated sealing elements (2.1, 2.2, 2.6, 2.8; 2B.1, 2B.2, 2B.6, 2B.8) which remain fastened to the cap (2, 2B), which is stably constrained with the first body (4, 4B) forming a single component which cannot be divided, the cap (2, 2B) further operatively coupled with the second driving element (3); wherein the second driving element (3) is designed to be driven by the cap (2) to allow opening and simultaneously breaking the seal elements (2.1, 2.2, 2.6, 2.8; 2B.1, 2B.2, 2B.6, 2B.8) of the tap (1, 1B).

7 Claims, 37 Drawing Sheets

(56) References Cited

FOREIGN PATENT DOCUMENTS

| | | | |
|---|---|---|---|
| EP | 1748028 | A1 | 1/2007 |
| FR | 2742207 | A1 | 6/1997 |
| WO | 2006051569 | A1 | 5/2006 |
| WO | 2012176221 | A1 | 12/2012 |
| WO | 2015179614 | A1 | 11/2015 |
| WO | 2018104973 | A1 | 6/2018 |

* cited by examiner

TAMPER-PREVENTING LIQUID DISPENSING TAP WITH AUTOMATIC OPENING

The present invention refers to a liquid-dispensing tap from containers, in particular and preferably the so-called "bag-in-box" containers (hereinafter referred to as BIB).

In particular, the present invention refers to dispensing taps, preferably for BIB systems with opening, which allows the dispensing of fluids contained inside the container (preferably BIB), made by means of a driving element with protruding flaps, on which it is possible to apply a lifting force, preferably transmitted by the index and ring finger, resting on the lower external surfaces of the flaps protruding from the dispenser tap and compensated by the opposable thumb placed in the opposite position to the lifting effort, as shown in FIG. 36.

In particular, the new inventive tap must have an anti-counterfeiting or anti-tampering system ("tamper evident") with band of breakage, which remains bound to the tap without being dispersed into the environment, as required by the new European and international directives on articles of disposable plastic (SUP), thus favoring their recovery and recycling.

The inventive tap further has geometries that favor the opening of the tamper-evident element on the driving element. In particular, the driving element must be bound to an elastic element, positioned inside the body of the inventive tap, which determines the opening (thanks to the traction force impressed on the driving element to which it is bound) and the self-closure (thanks to the elastic characteristics of the material and the special dome geometry).

Furthermore, the inventive tap has to be adapted to the solutions of connectors on the market, subject of patents in the name of the same Owner of the present Application, namely FR-A-2742207, EP-A1-1627850 and WO-A-2012176221.

In particular, the tap of the present invention can be considered a technological innovation of a known version currently on the market and which was protected by patent EP-A1-0432070.

Such known dispensing tap, while functioning effectively, would not be able, maintaining the current conformation, to comply with the new European and International Directives on single-use plastic articles (SUP), as equipped with a warranty seal that comes off and that, if not properly disposed of, would be dispersed in the environment.

The configuration of the dispensing tap currently on the market is formed of four elements, a first cap 2A, a first driving element 3A, an internal valve or membrane 5 and a first body 4, as represented in FIGS. 16, 17, 18, 19. FIG. 16 shows the tap currently on the market in the closed position, with the seal tamper evident still intact, highlighting the fact that the system, preferably BIB, has not yet been opened as a guarantee for the final consumer. Once the tamper evident band is removed, as shown in FIG. 35, there occurs the condition of having the tap ready to be opened for the first time, as highlighted in the images of FIGS. 20, 21, 22 and 23. In this phase, the tamper-evident band 2A2 of the first cap 2A of FIGS. 16, 17, 18 and 19 has to be disposed of (correctly or not, and in any case even if disposed of correctly, due to its small size, it would not recycled properly but would end up undifferentiated: this makes the current application on the market not compliant with the new European and International Directives on disposable plastic items (SUP)) and then one can proceed with the first opening, as shown in FIG. 36.

Preferably, as shown in FIGS. 23, 24, 25 and 26, where the tap currently on the market can be seen in the opening position to allow the delivery of fluids from containers, the opening force is transmitted to the internal sealing elements (internal valve or dome-shaped membrane) 5 of FIG. 31, also shown, as regards the version currently on the market, in FIGS. 17, 18 and 25, in which the first driving element 3A of FIG. 18 with the flaps 3A1 of FIG. 27 are stably connected by means of its coupling end 3A2 on the cavity of the coupling 5.4 (FIG. 21) obtained inside the internal valve or elastic member.

The internal valve or membrane 5 also and above all has the purpose of being stably and hermetically coupled with the body 4 shown in FIG. 29, as regards the configuration currently on the market, exploiting the internal wall 4.4 and the internal throat 4.7 of FIG. 29. The internal valve or membrane 5 is locked in the right position, and above all resists the stresses it receives on the first driving element 3A of FIG. 27 during the phases of opening of the tap 1, transmitted as described above by the force of opening imposed on the surfaces 3A1 of the external flaps, thanks to the internal geometries 2A4 of the first cap 2A stably bound in turn to the first body 4 of FIG. 29 by means of welding, specifically in this case of the prior art tap on the market, of ultrasonic welding. The description of the tap 1A currently on the market is contained in the above-cited document EP-A1-0432070, which can be considered the progenitor as regards the self-closing dispensers of liquids.

Referring to FIG. 17, the integrated seal 2A with removable tamper evident band 2A2 is shown, with opening by means of the first driving element 3A connected via the geometry 3A2 of FIG. 32 to the internal valve or domed elastic membrane 5 by means of the coupling cavity 5.4 of FIG. 31, which allows, due to its elastic and geometric properties, self-closing the vault and releasing the flaps 3A1 of the first driving element 3A of FIG. 27.

In particular, referring to FIGS. 15 to 26, they show the transition from the latest version currently marketed all over the world of the prior art dispensing tap, to a dispensing tap 1A made entirely of plastic material formed by a first body 4 of FIG. 29.

In particular, it is formed, referring to FIG. 29, of a rear elongated zone 1A BACK on which the connection element 4.6 and the anti-removal sharp-edged element 4.5 are obtained, which are coupled stably with a sharp edge present on the connecting nozzle to the bag (in the case of the BIB version), not shown. On tap 1A it is also possible to highlight, referring to FIG. 19 or 29, the front part 1A FRONT, whose front cylinder is placed perpendicularly with respect to 1A BACK, which acts as the main seat on which the following are assembled, as shown in FIGS. 17 and 18: the internal valve or membrane with elastic dome 5, made of flexible elastomeric material, a first driving element 3A bound to the internal valve or membrane with flexible dome 5 by means of a mechanical coupling with coupling end and coupling cavity (3A2-5.4), and a first cap 2A with removable seal 2A2. In particular, referring to FIG. 25, the internal valve or membrane with flexible dome 5 is the "heart" of the dispensing system that actually gives rise to the dispensing tap since, based on its position determined by the position of the first driving element 3A to which it is stably bound and to which it is possible to apply traction or not on the external flaps, determines the opening and closing of the tap.

Further, the internal valve or membrane with elastic dome 5, as highlighted in FIG. 18, determines the perfect seal to the liquids of the tap itself, interfering with the internal surfaces of the body as represented in FIG. 18, where the following elements are shown: upper seal 4.3—sealing circumference 5.1, with the lower sealing elements (on the outlet hole of the liquid) inner wall 4.4—outer vertical wall of seal 5.3 of the valve or membrane with elastic dome 5A on body 4A.

Further, the internal valve or membrane with elastic dome 5 has the function of "spring" which allows closing or opening the liquid dispensing hole, as shown in FIG. 25. Again, the main peculiarity of the internal valve or membrane with elastic dome with spring 5 allows the automatic closing of the tap 1A once the flaps of the first driving element 3A are released and therefore no action is applied on them. To better specify, the first driving element 3A is stably bound to the internal valve or membrane with elastic dome 5 by means of the end of the coupling 3A2. The first driving element 3A has the purpose of allowing the final user to be able to open and close the liquid exit hole, carrying out, with the index finger and the middle or ring finger, a traction on the flaps (compensated by the opposable thumb finger which instead creates a pressure on the upper cap 2A on the specially obtained central seat), as shown in FIG. 30, and allows the tip of the internal valve or membrane with elastic dome with spring 5 to be able to free or close the liquid exit hole.

Further, the domed valve receives the thrust necessary to keep the tap perfectly closed (hence a sort of pre-winding of the spring) from the internal thrusting element 2A.4 of FIG. 28 of the particular first cap 2A always highlighted in FIG. 28, which is the final component assembled on the first body 4 which, in this currently produced version, is welded with the first body 4 by means of ultrasonic welding.

The first cap 2A is stably bound to the first body 4A, preferably by means of ultrasonic welding but, with the necessary modifications, it is also possible to constrain the two components stably by means of interlocking (not shown), or with more modern and fast welding methods, like laser welding. In particular, the first cap 2A with removable tamper evident band 2A2 of FIG. 17 has the property of highlighting any uses and/or tampering with the end customer. Further, the tamper evident band 2A2 guarantees the hermetic closure of the tap 1A from the producer to the consumer, as it blocks the vertical displacement of the flaps due to the possible traction force imposed by the fingers, as better highlighted in FIGS. 35 and 36.

In particular, before carrying out the first opening of the tap 1A, the user has to remove the tamper evident band 2A2 from the tap 1A itself, as shown in FIG. 35. In this way, the tamper evident band 2A2 is completely detached from the inventive tap 1A and becomes a piece by itself to be disposed of separately from the rest of the packaging.

Object of the present invention is creating a dispensing cap that allows having a tamper evident system that can be integrated on the current tap without upsetting the current production systems of the tap itself, with warranty seal and automatic opening in compliance with the new European and International Directives on the articles of disposable plastic (SUP), and which therefore remains bound to the tap after its opening and does not disperse in the environment, or is disposed of incorrectly, allowing its correct recycling, and that it adapts itself to the connection systems available on the market.

The object of the present invention is therefore able to eliminate the tamper evident band 2A2 of the component of the first cap 2A of FIG. 17, replacing it with an innovative component that allows achieving the same purpose as the component 2A produced today, i.e. the protection of the product contained in the container, preferably BIB, and giving evidence to the customer of any tampering, but eliminating the 2A2 band, which today is removed and potentially could be dispersed in the environment, if not properly disposed of as suggested.

In particular, the cap 2 of FIG. 2 has to be designed to meet the requirements of the new European Regulation called "Disposable Plastics" (SUP), recently adopted by the European Parliament on March 27, as well as, for example, the AB 319 California regulations in the United States. Both Regulations aim to increase the amount of plastic collected and recycled, thereby reducing marine litter. Consequently, the Consumer Packaged Goods (CPG) company invited their partners to develop solutions that not only comply with the new regulations, but also provide environmentally conscious consumers with solutions that fit their lifestyle and provide them with the best experience of packing.

Referring to these new needs of the market, the Applicant has developed a new cap with integrated warranty seal, shown in FIG. 33 and for the interlocking version in FIG. 34, which has been designed to promote post-use recycling, since the bands, preferably lateral (but they can also be placed frontally or rearward with changes to the cap and driving element, but always falling within the teaching of the present invention) are no longer detached from the tap, as it happens today, but remain bound to it, allowing, upon closing, to go through the proper recycling flow.

Another object of the present invention is creating a tap that is completely made of plastic material (therefore easily recyclable) and that adapts to the connector systems designed ad hoc for this tap dispenser on the market today, actually replacing version 1A of the old known tap, without going to upset the existing production cycles, and therefore not having to invest much money for the "green" change made.

The above and other objects and advantages of the invention, as results from the following description, are achieved with a dispensing as described in the independent claims. Preferred embodiments and non-trivial variations of the present invention are the subject matter of the dependent claims.

It is intended that all enclosed claims form an integral part of the present description.

It will be immediately obvious that innumerable variations and modifications can be made to what is described (for example relating to shape, sizes, arrangements and parts with equivalent functionality) without departing from the scope of the invention as contained in the attached claims.

The present invention will be better described by some preferred embodiments thereof, provided as a non-limiting example, with reference to the attached drawings, in which:

FIG. 20 is a perspective view of the tap according to the prior art in the closing position and with the seal with removable band removed and disposed of;

FIG. 21 is a front view of the tap according to the prior art in the closing position and with the seal with removable band removed and disposed of;

FIG. 22 is a side view of the tap according to the prior art in the closing position and with the seal with removable band removed and disposed of;

With reference to the Figures, an exemplary and non-limiting embodiment of the dispensing tap 1, 1A, 1B of the present invention is shown and described. It is evident to a skilled person in the art that the described tap can be made in shapes, sizes and with equivalent details, and can be used for containers of various types, for example those called “Bag-in-Box”, but also those of the rigid or semi-rigid type or others.

Figure 1:
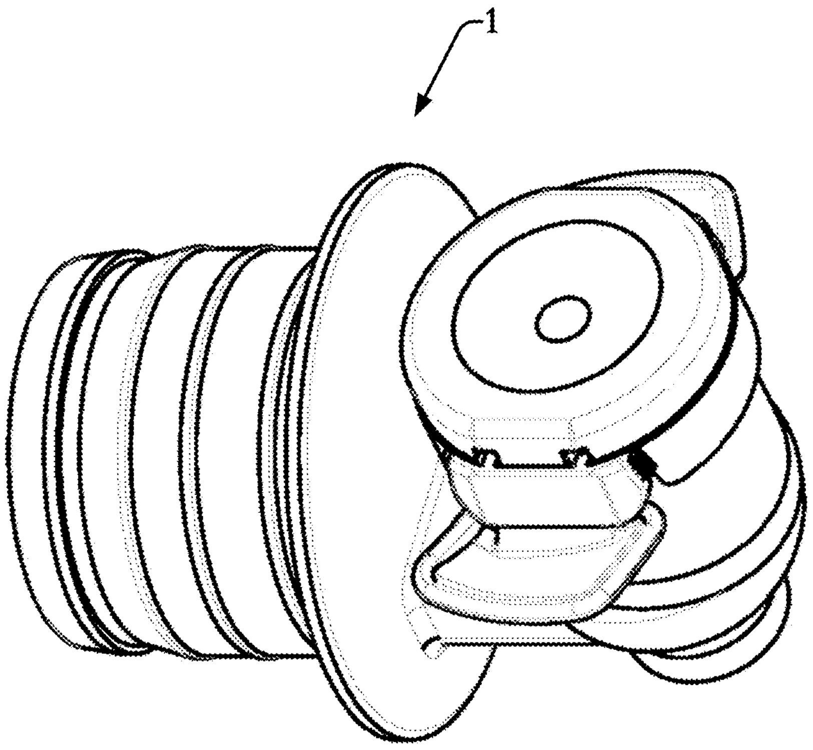
FIG. 1 is a perspective view of an embodiment of the tap according to the present invention in a closing position.
Figure 29:
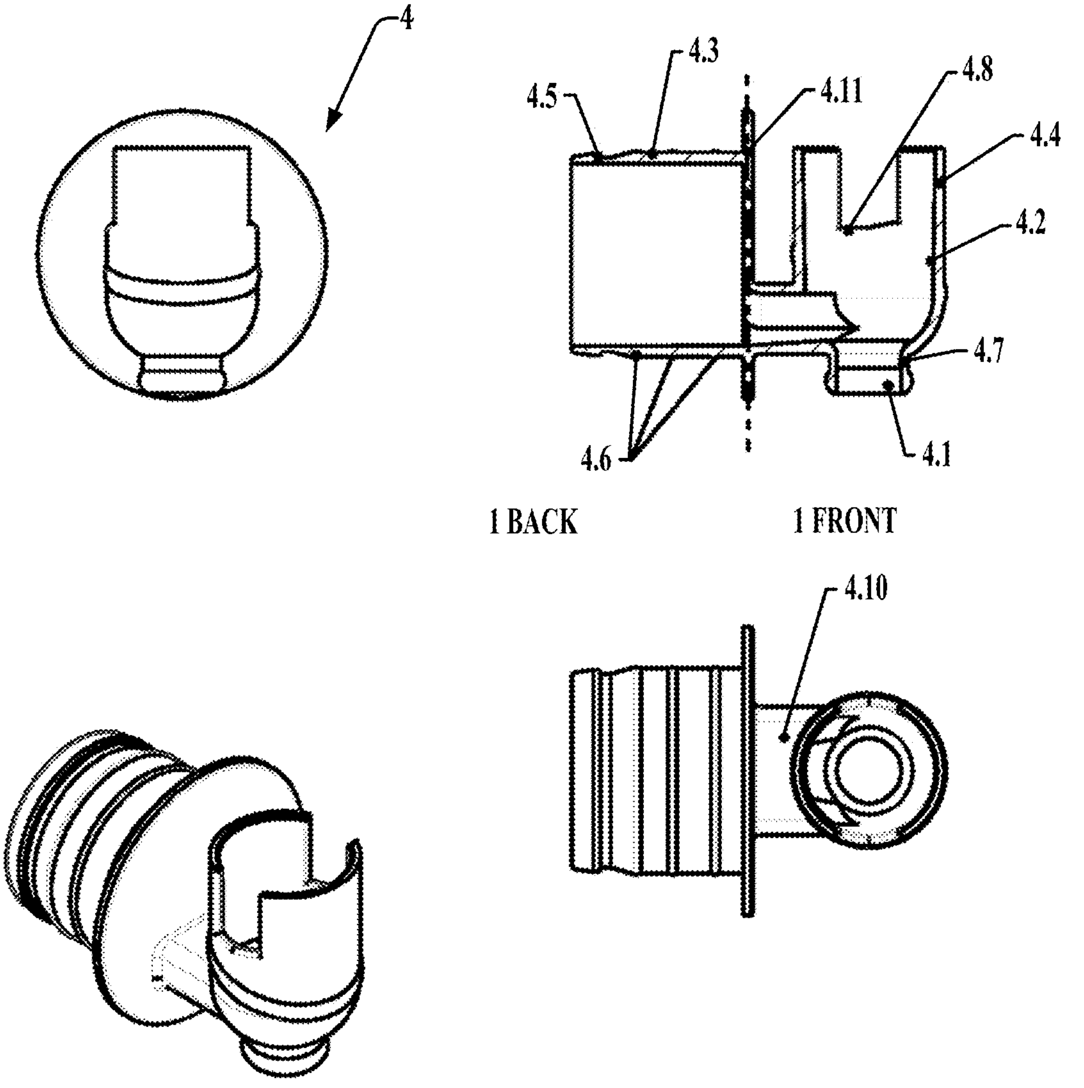
FIG. 29 is a front side isometric, sectional and top view of the body component currently on the market of known solutions that however, for the solution that provides for the welding of the two components (body and cap), does not change even for future versions.
Figure 33:
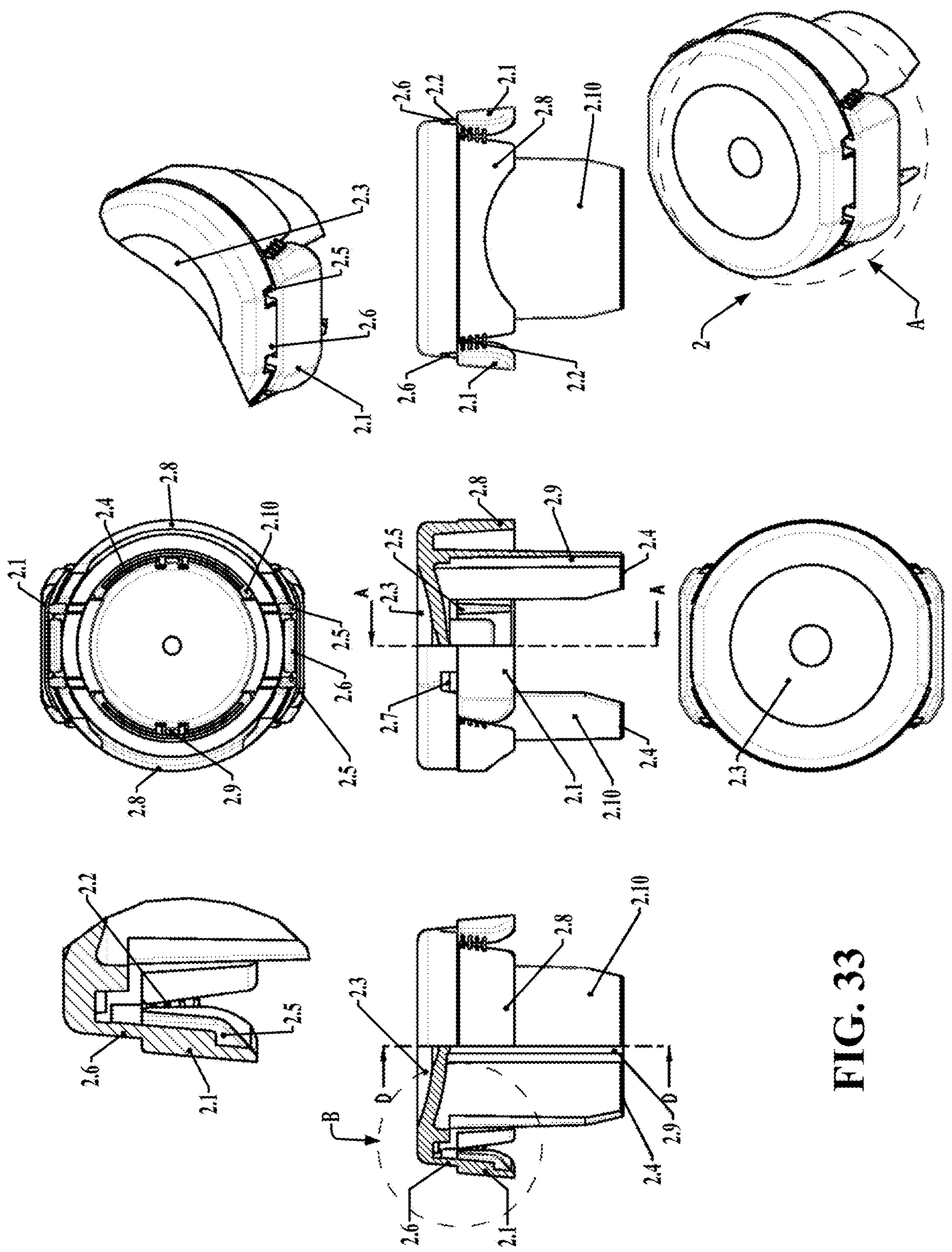
FIG. 33 is a sectional front side and top isometric view and detailed view of the driving element of the future version with welding.

A first embodiment of the tap 1 of the invention is shown in FIG. 1, and uses a first body 4 of FIG. 29, considered traditional as it allows reusing such component of the tap currently on the market (thus resulting in considerable savings of money and time) which is then coupled with the new innovative cap 2 of FIG. 33.

Figure 34:
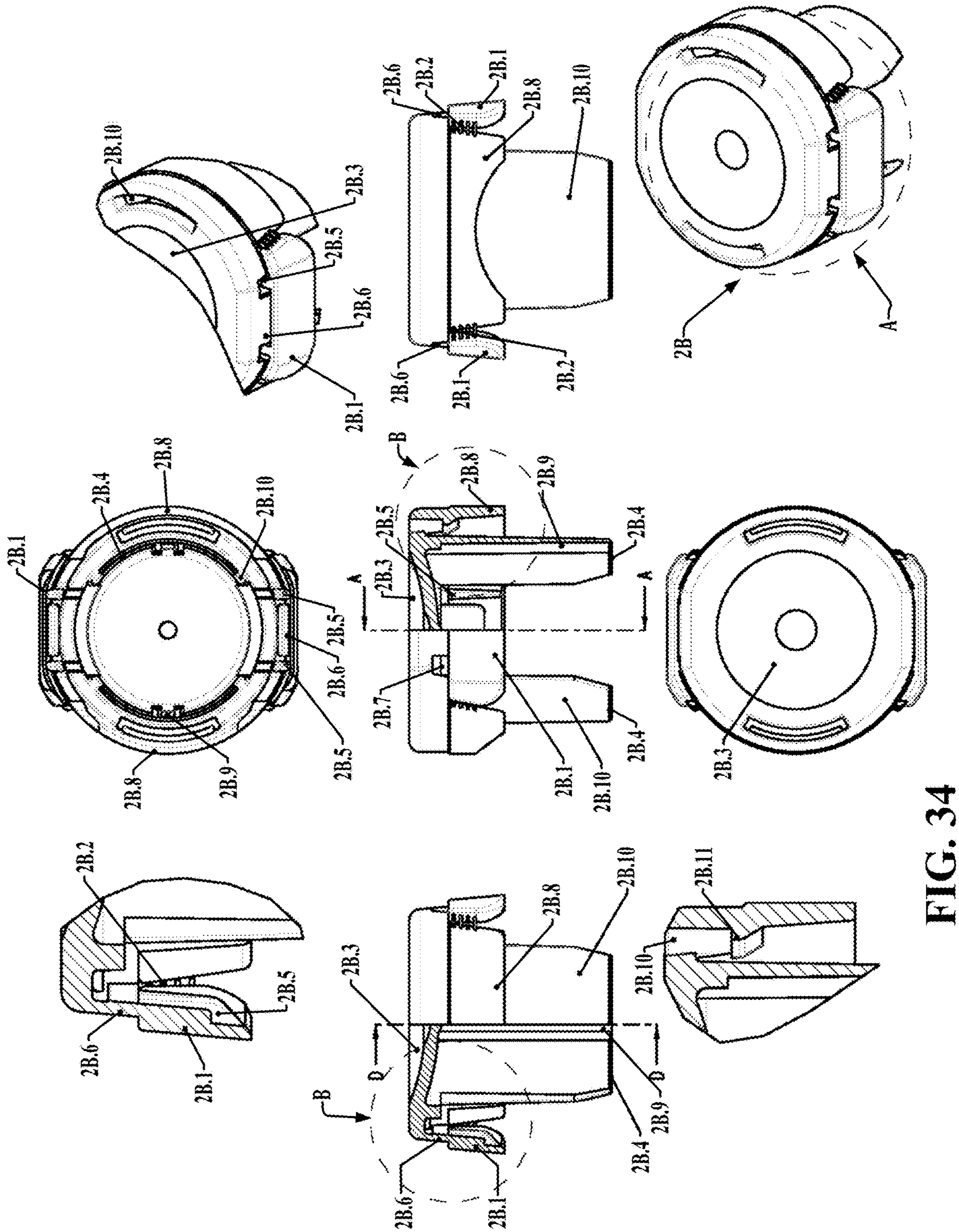
FIG. 34 is a sectional front side and top isometric view and detailed view of the driving element of the future interlocking version.
Figure 35:
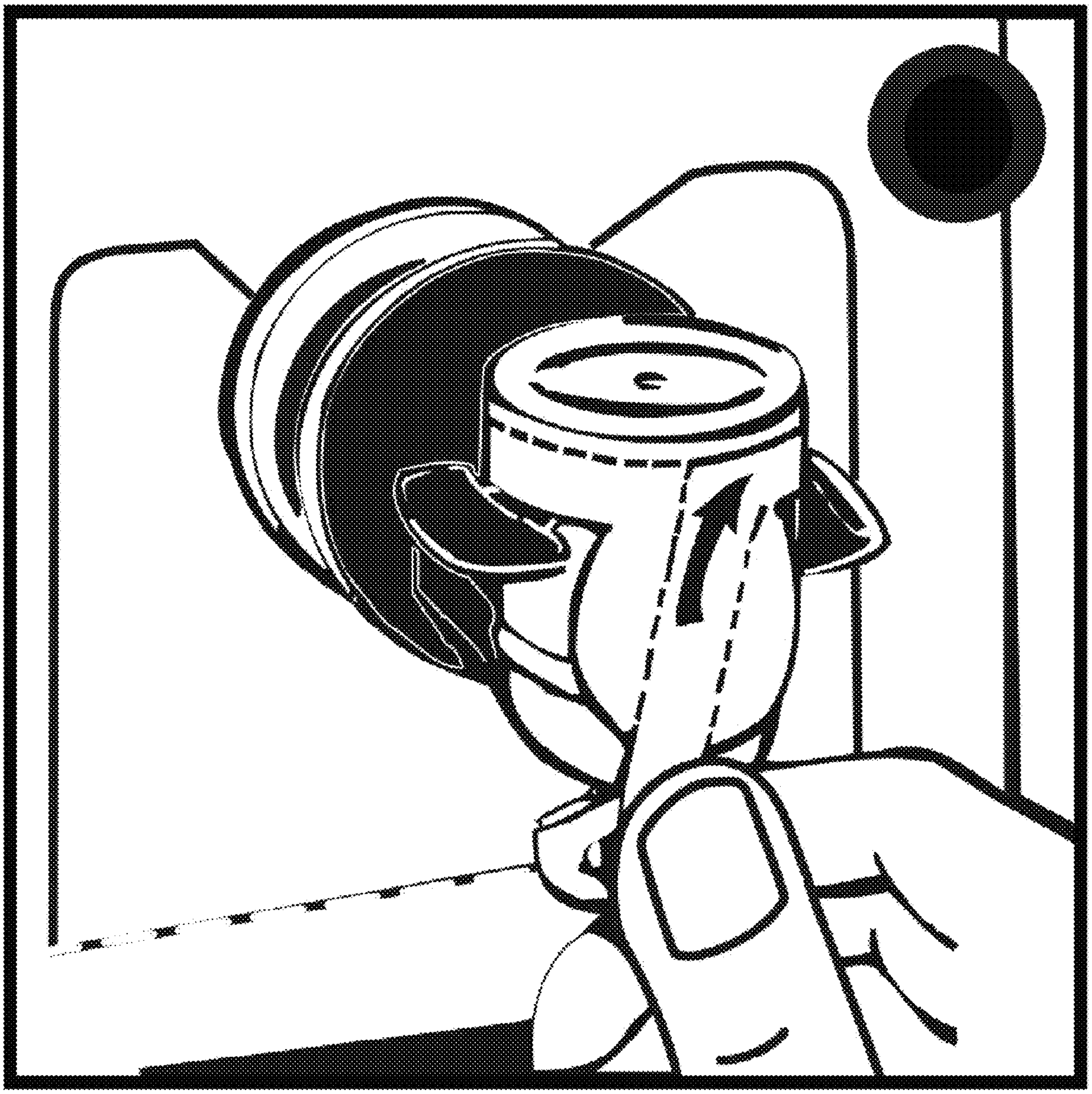
FIG. 35 is a stylized image at the time of removal of the tamper evident band of the tap currently on the market which in the future will not comply with the new European and international directives.
Figure 37:
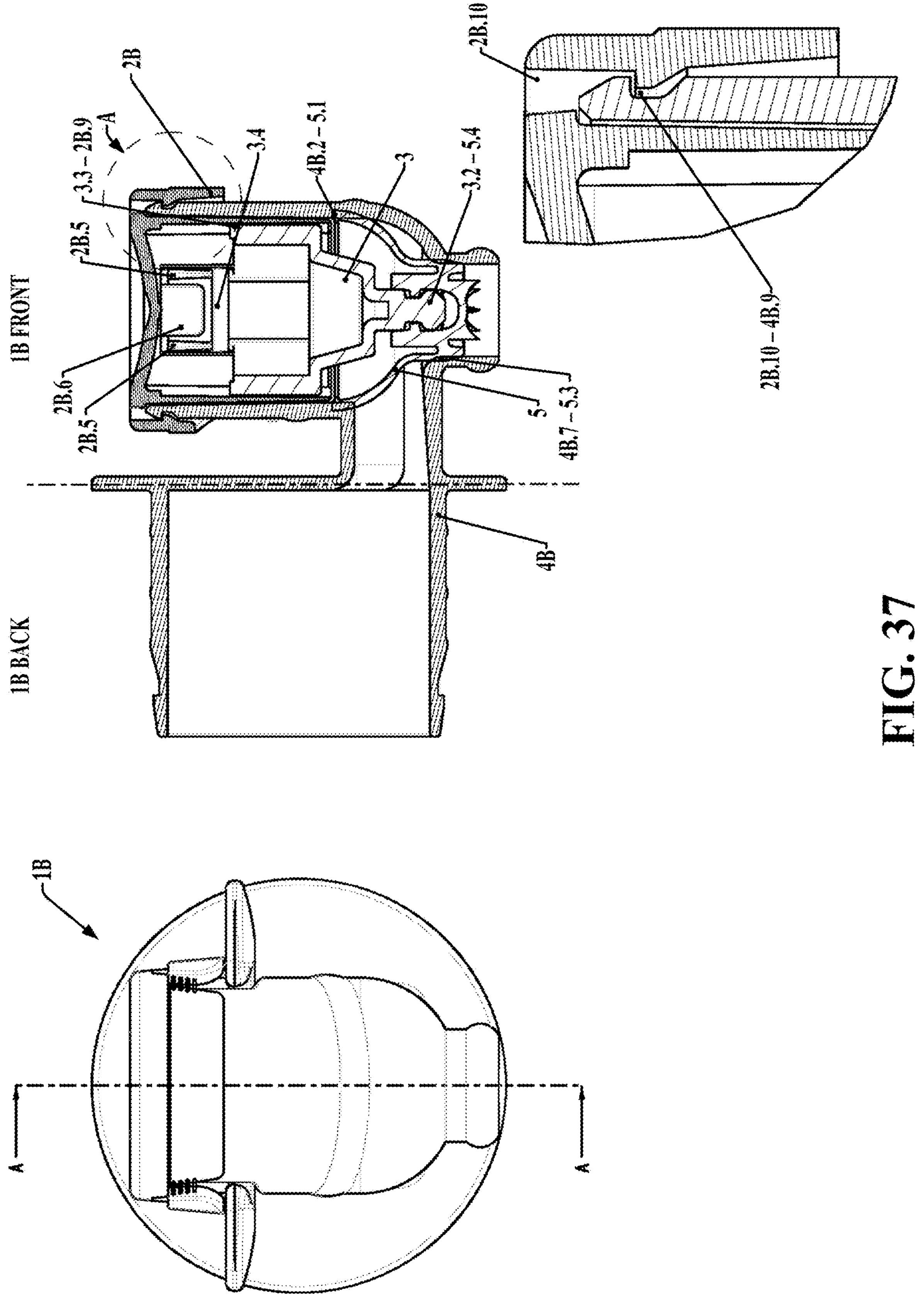
FIG. 37 is a sectional front side view and detailed view of the assembly of the inventive tap in the future version with the body components and interlocking cover.

A second embodiment of the tap 1B of the invention is shown in FIG. 37, and instead uses a second body 4B (shown in detail in FIG. 30) which pairs with the new third cap 2B of FIG. 34 both with useful geometries to obtain the joint between the two components, which both serve for the delivery, by changing only the method of connection between cap 2 and first body 4 (traditional welding between two components as is the case today) and between third cap 2B and second body 4B (interlocking)).

Figure 15:
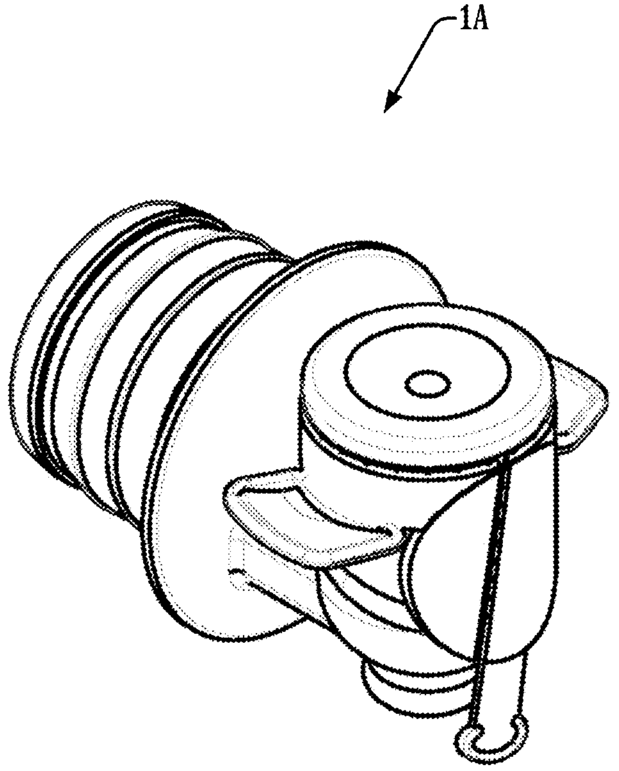
FIG. 15 is a perspective view of the tap according to the prior art.
Figure 16:
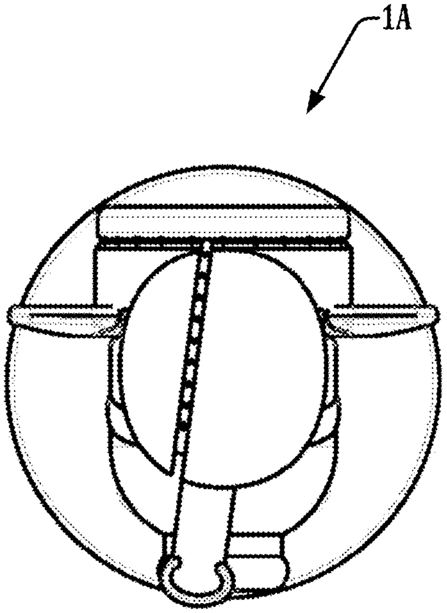
FIG. 16 is a front view of the tap according to the prior art.
Figure 17:
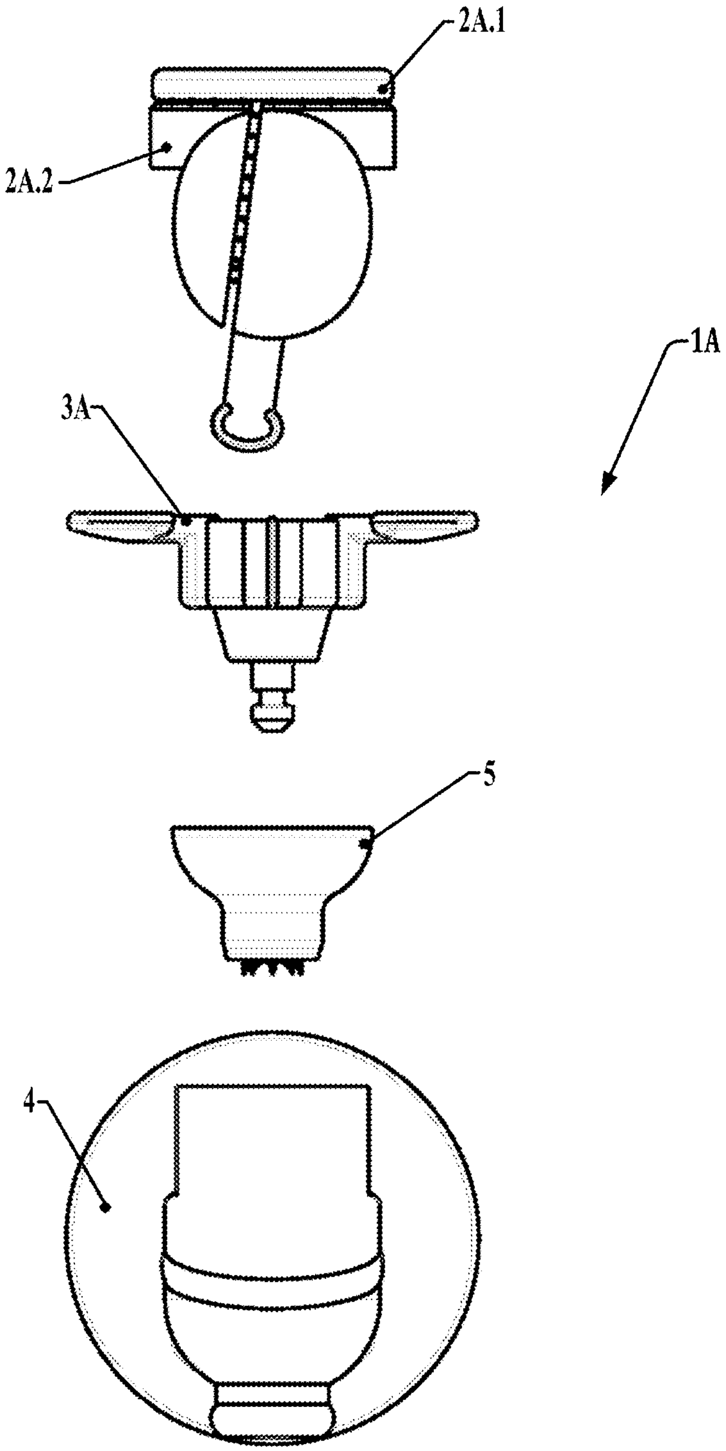
FIG. 17 is an exploded view of the tap according to the prior art.
Figure 18:
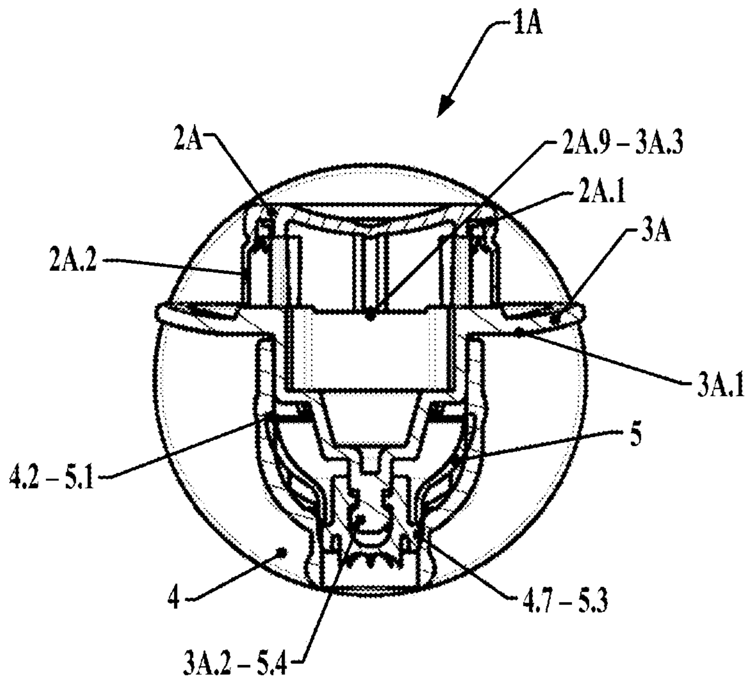
FIG. 18 is a sectional front view of the tap according to the prior art in the closing position and with the seal with an intact removable band.
Figure 19:
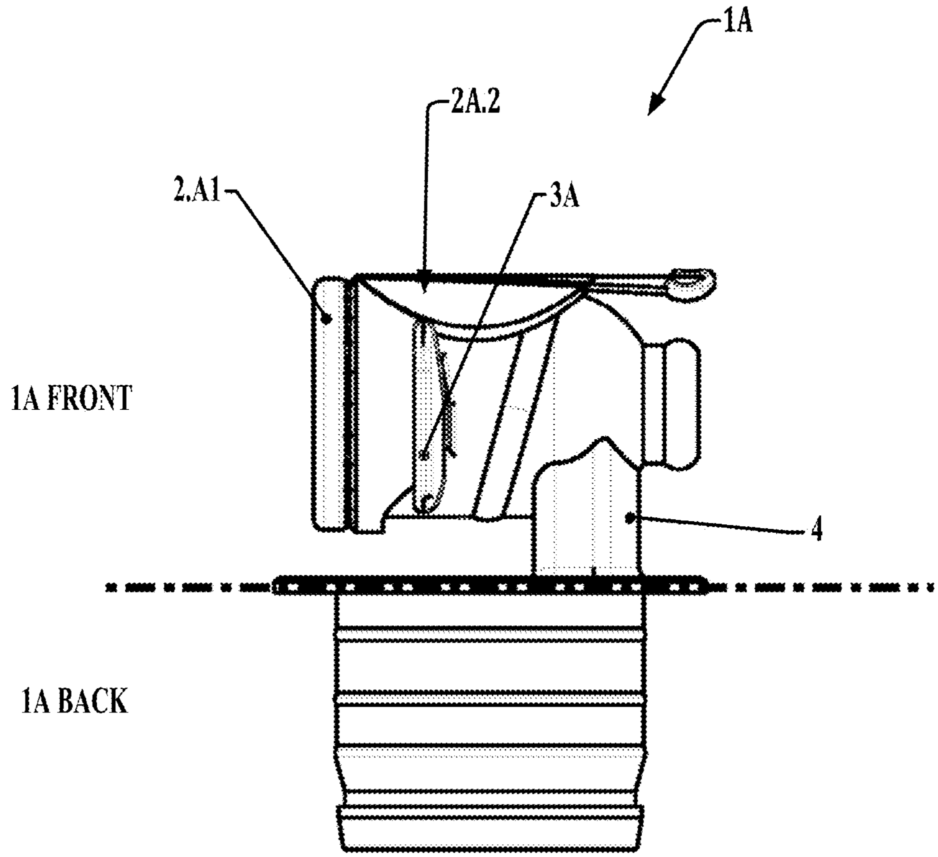
FIG. 19 is a side view of the tap according to the prior art in the closing position and with the seal with an intact removable band.
Figure 20:
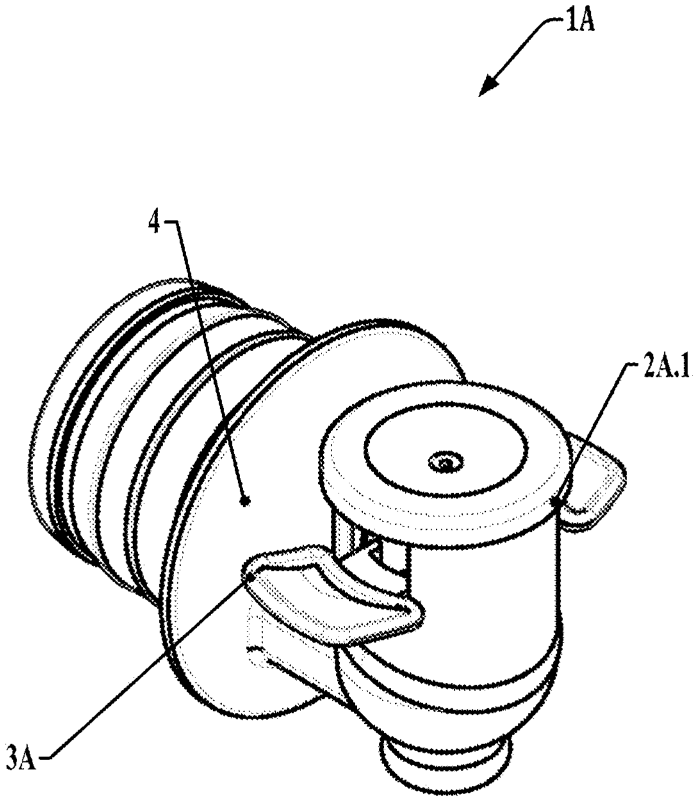
Figure 21:
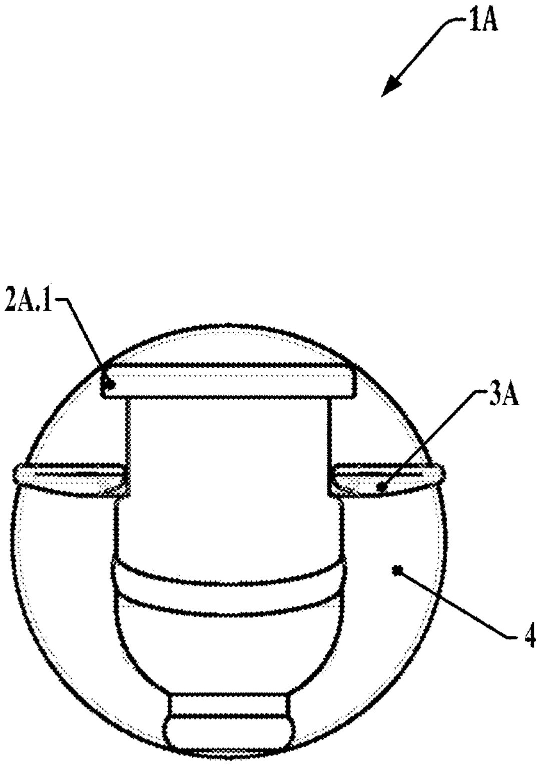
Figure 22:
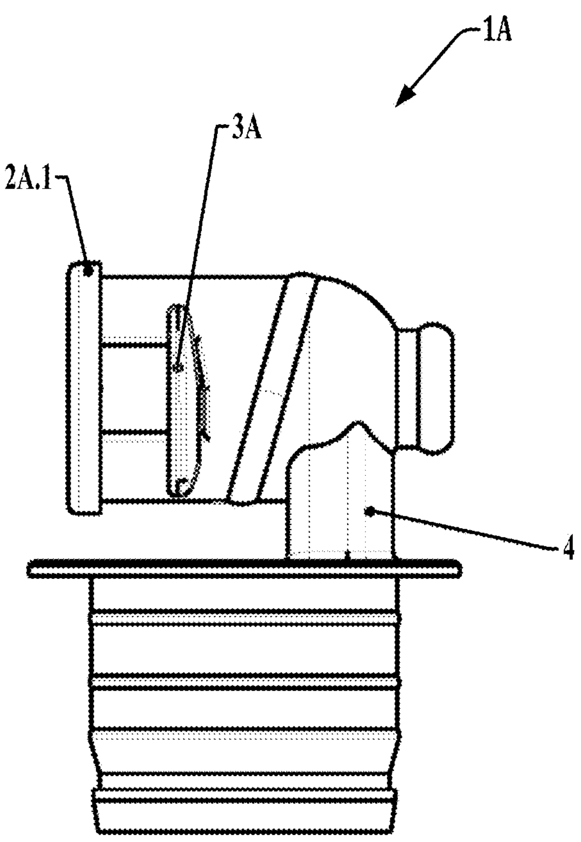
Figure 23:
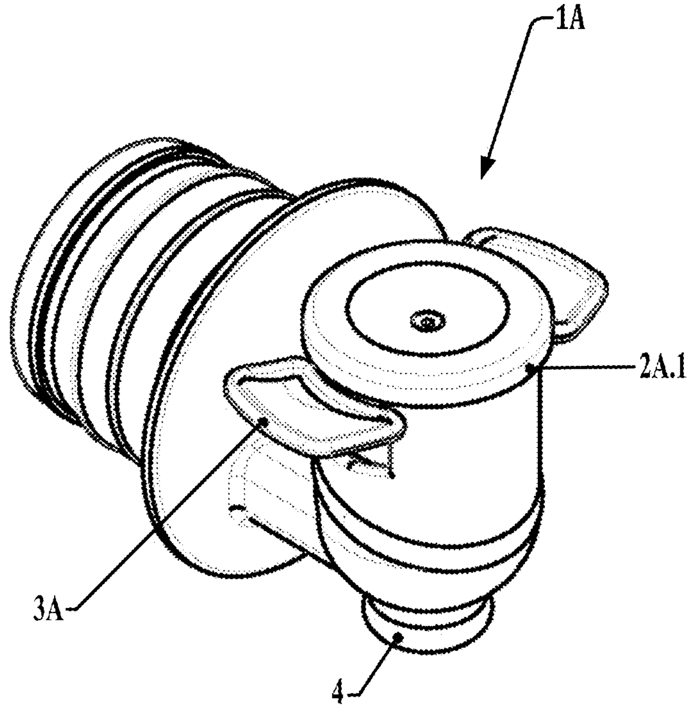
FIG. 23 is a perspective view of the tap according to the prior art in its opening position.
Figure 24:
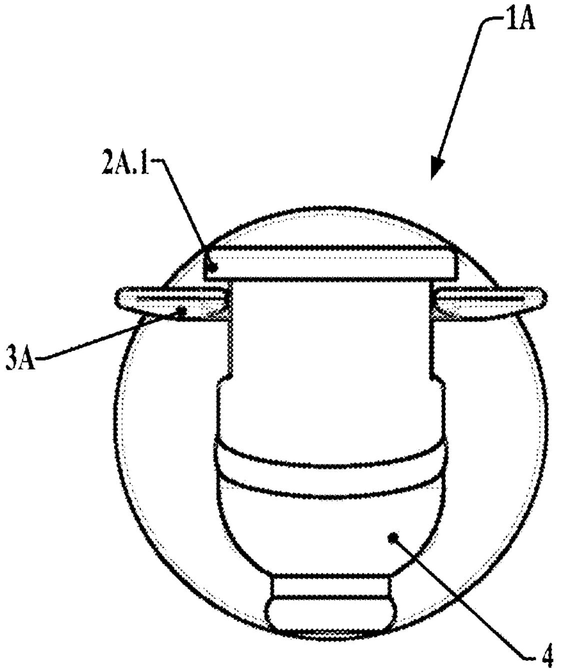
FIG. 24 is a front view of the tap according to the prior art in its opening position.
Figure 25:
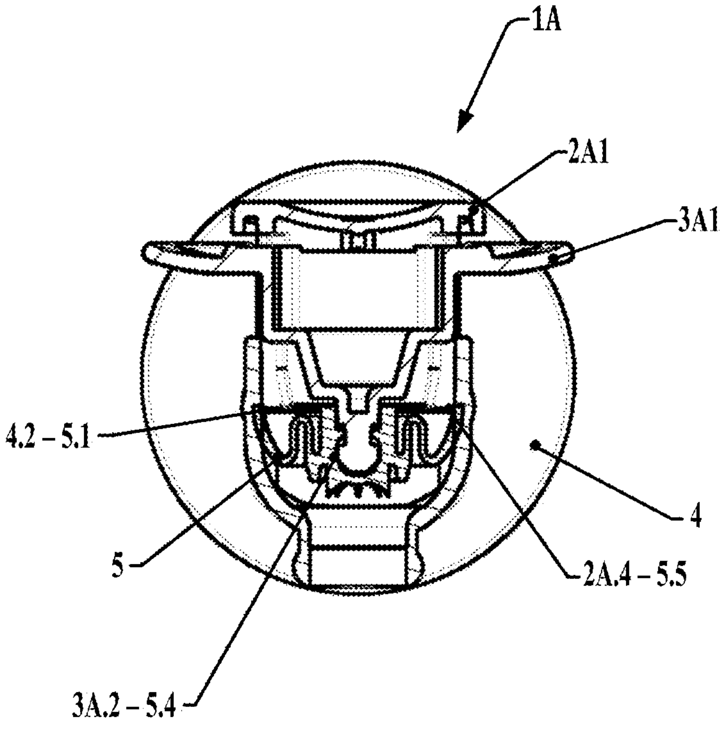
FIG. 25 is a sectional front view of the tap according to the prior art in its opening position.
Figure 26:
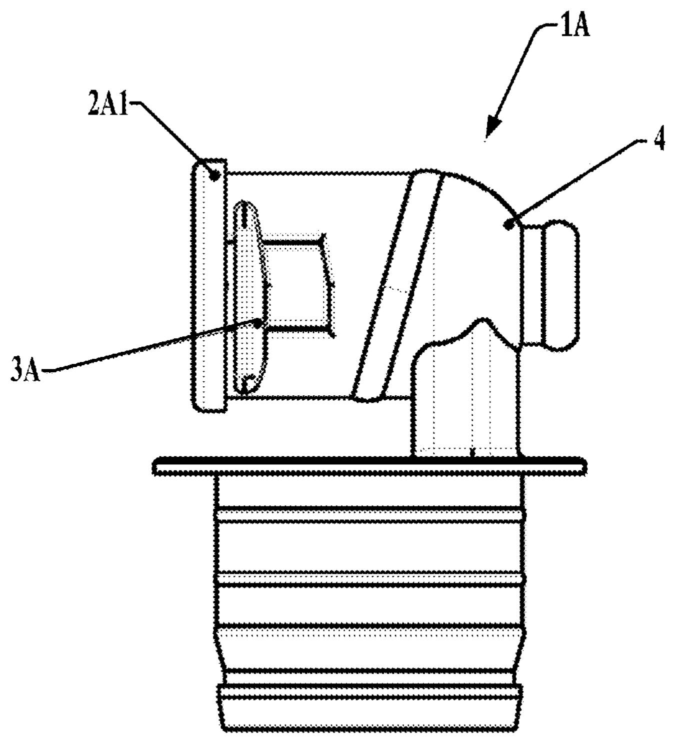
FIG. 26 is a side view of the tap according to the prior art in its opening position.
Figure 27:
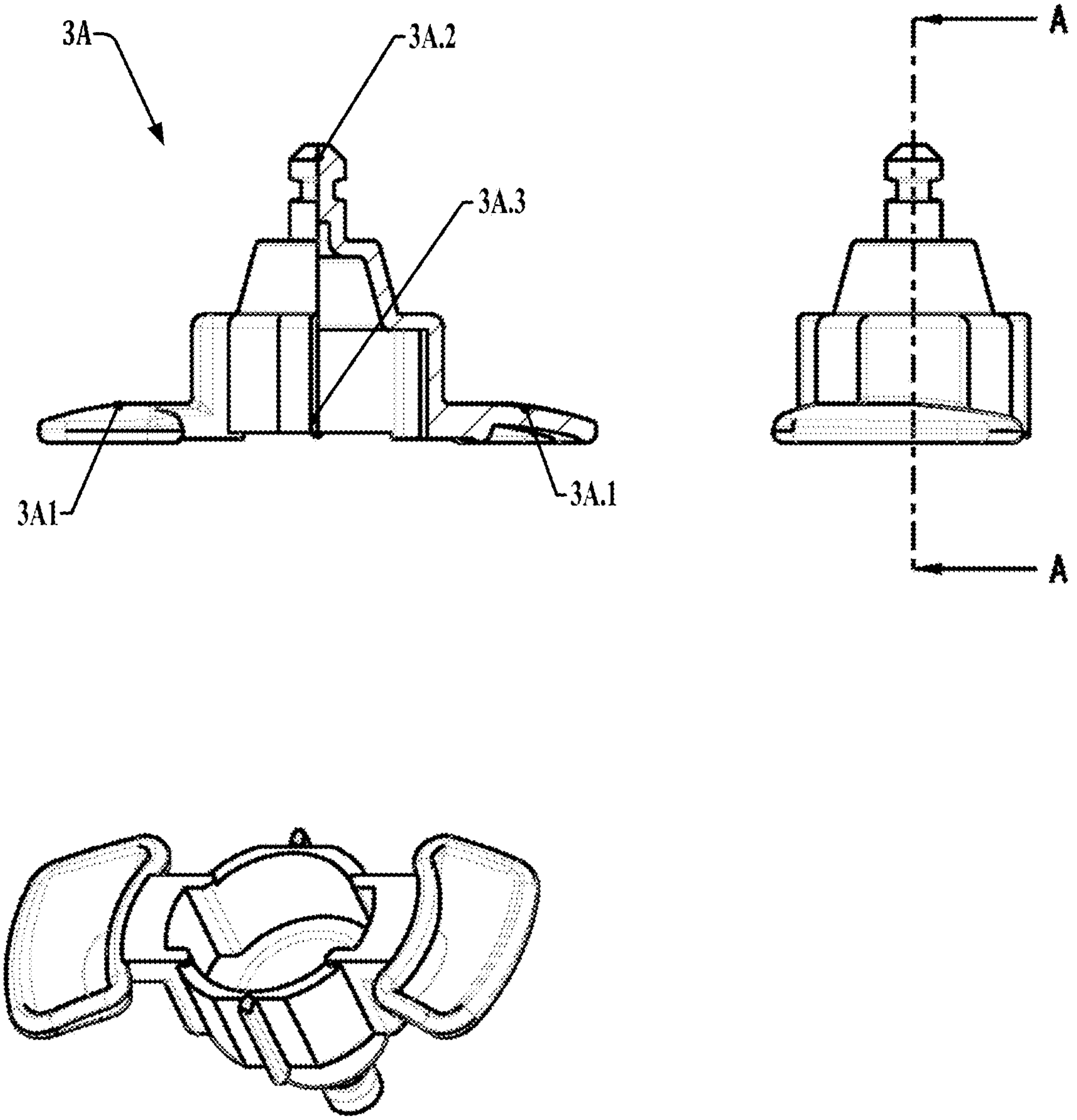
FIG. 27 is a cross-sectional front side and top isometric view of the currently commercially available driving element component of the known solution.
Figure 28:
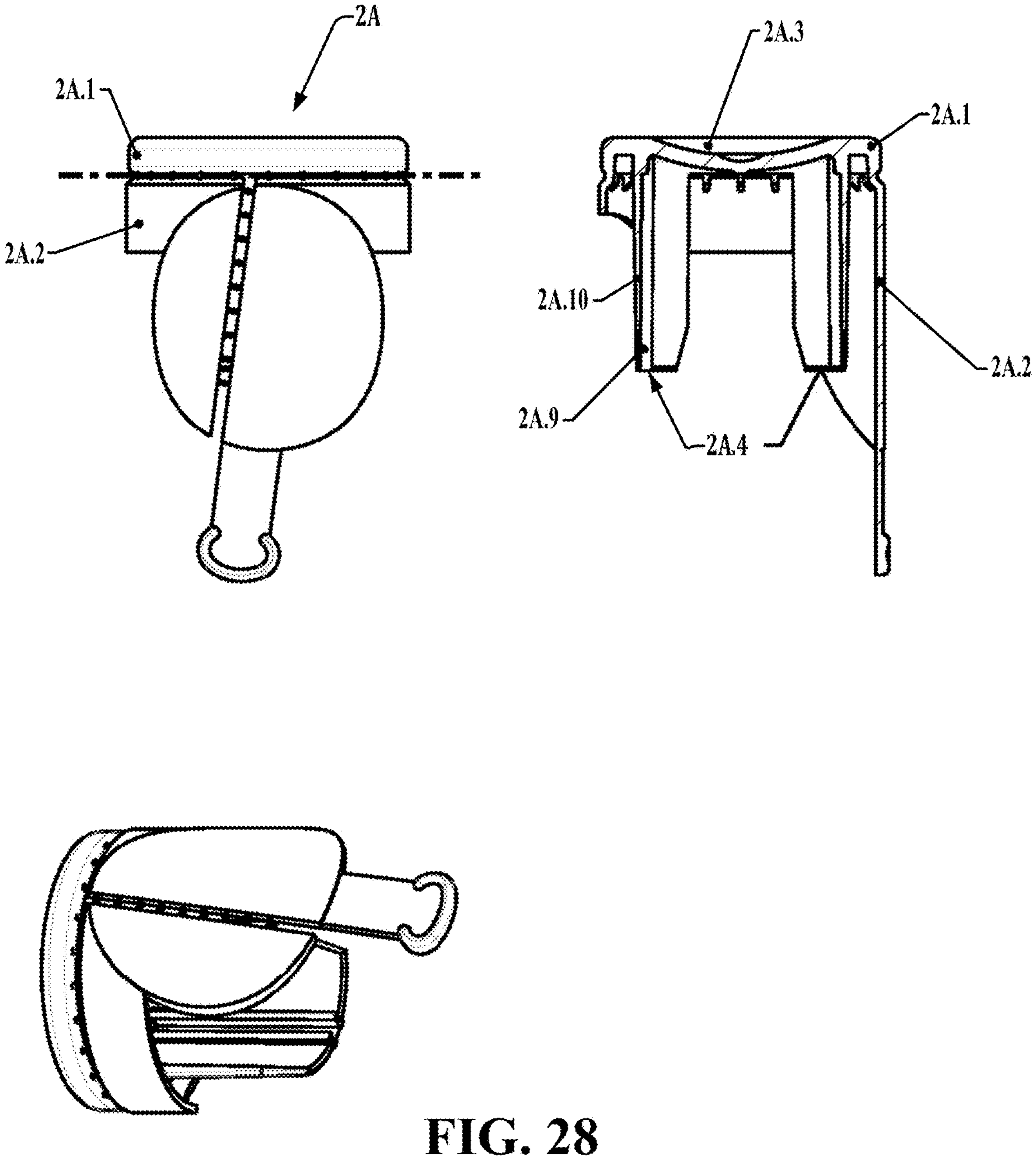
FIG. 28 is a front side isometric, sectional and top view of the component cap with removable tamper evident band no longer in accordance with the future, currently on the market of the known solution.
Figure 31:
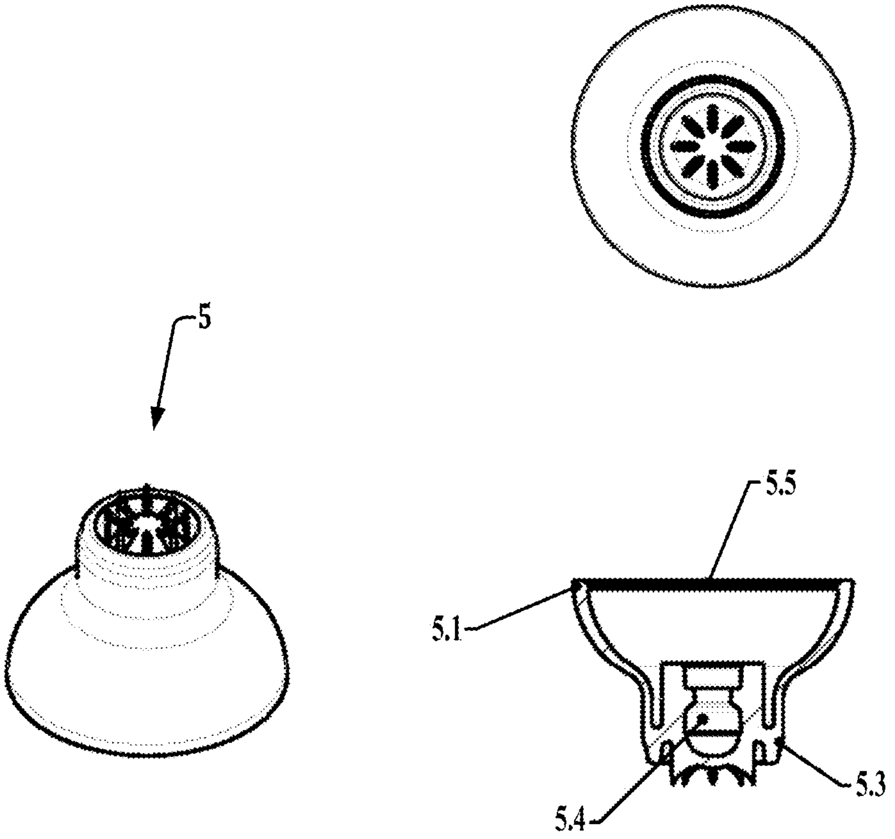
FIG. 31 is a cross-sectional front side and top isometric view of the internal valve component currently on the market of known solutions but which remains the same also for future solutions.
Figure 32:
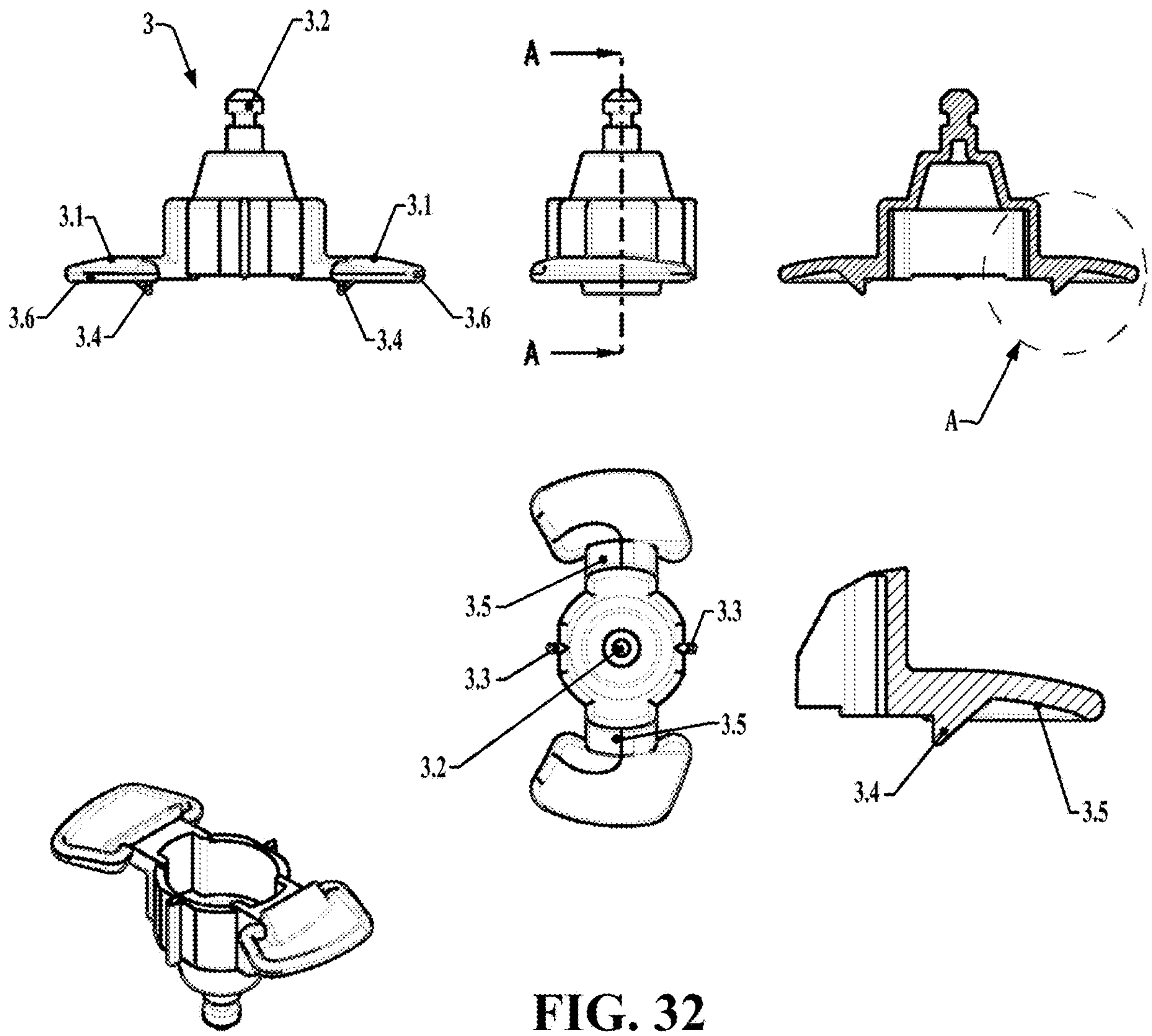
FIG. 32 is a sectional front side and top isometric view and detailed view of the driving element of the future version.

They comply, in both versions (tap 1 of FIG. 1 and tap 1B of FIG. 37), with the new European and International Directives on single-use plastic articles (SUP), and in both versions they also use the new driving flaps (second driving element) 3 of FIG. 32 with the driving opening projections or wedges 3.4 of FIG. 32 integrated on each fin (this allows modifying the current driving element as it is easy and cheap to add the driving projections or wedges 3.4 of FIG. 32 of opening on each fin) and the internal valve or membrane with elastic dome 5 of FIG. 31 equal to that used today on the tap 1A on the market shown in FIG. 15. The fact of being able to reuse the components currently produced (or in any case reuse them with a small modification, as in the case of the driving element with the addition of the wedges) gives further value to the present invention, as it saves time and money and does not change the final perception of the client, as the new geometries are “hidden”.

Figure 30:
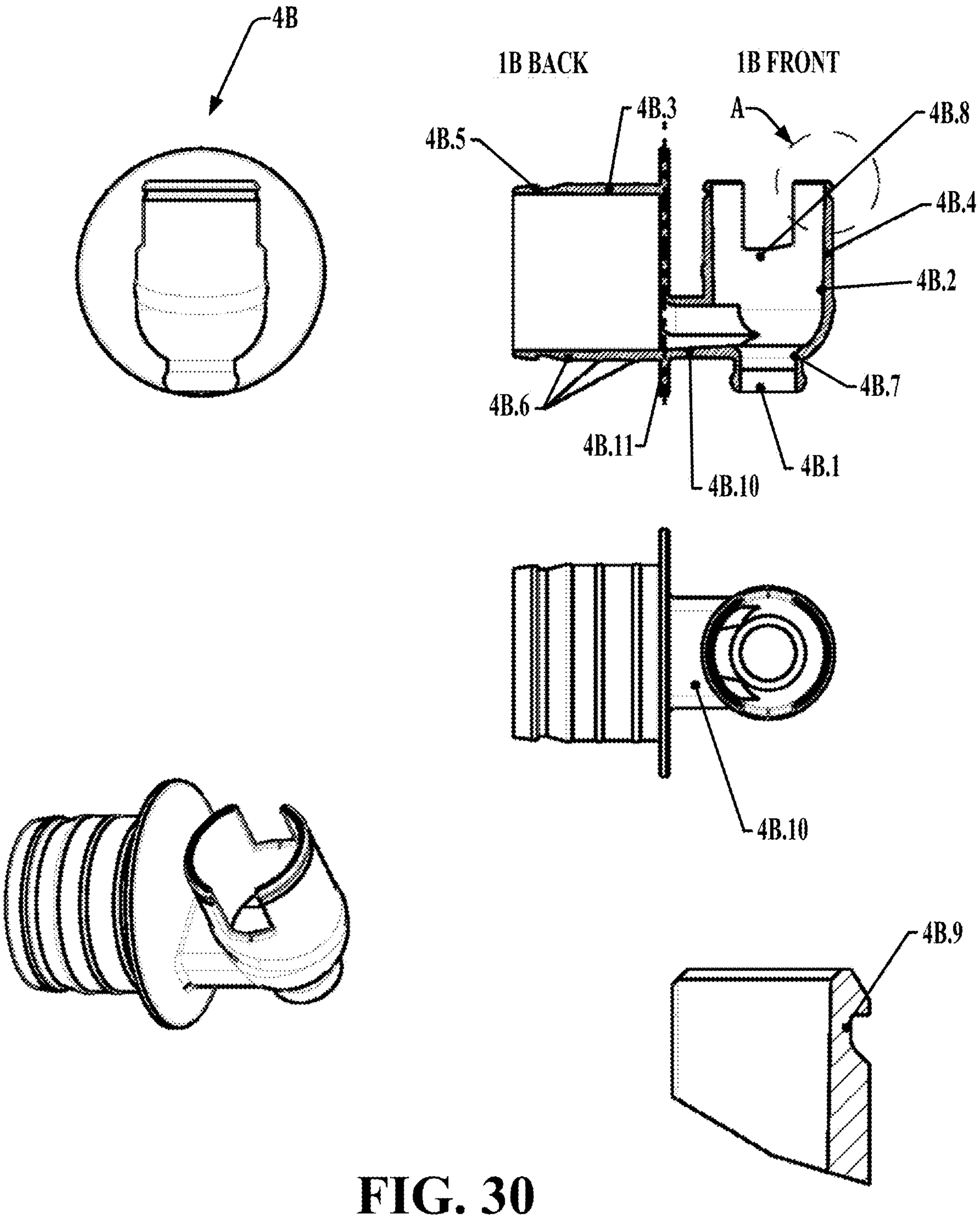
FIG. 30 is a front side isometric, sectional and top view of the body component of the future version conformed with mechanical hooks for the cap (in its version with mechanical hooks)

Referring to the Figures, the tap of the present invention is provided in two main configurations (tap 1 shown in FIGS. 1 to 14, and tap 1B shown in FIG. 37); in the first configuration, the tap 1 basically comprises:

a first body 4 (FIG. 29), which is a “traditional” body with geometry equal to the one used today for the tap 1A currently on the market: this provides a huge advantage in terms of production cost and time of the entire project, as it allows using components and equipment to produce the existing taps 1A to make the inventive tap 1. Such first body 4 is equipped with an elongated end 4 BACK formed of a cylinder 4.3, preferably placed perpendicularly with respect to the front cylinder 4.2 of FIG. 29, identifiable in the area 4 FRONT, where the following are made: the geometries necessary for the purpose of obtaining, thanks to the interference between the surfaces of the components concerned, in this case the first body 4 and the connecting nozzle with the container (not shown), the connecting and liquid sealing element 4.6 on the connecting nozzle with the container (not shown), and the anti-removal (anti-counterfeiting) sharp-edged fitting element 4.5 with the container (not shown), preferably but not limited to the BIB. Frontally, in 4 FRONT of FIG. 29, there is a cylinder 4.2, inside the which the internal sealing wall 4.4 and the internal sealing groove 4.7 of FIG. 29 are obtained, which is coupled with the sealing circumference 5.1 and the vertical sealing wall 5.3 of the internal valve or membrane with elastic dome 5 of FIG. 31. The seats 4.8 are also obtained on the front cylinder which acts as guide and seat of the driving projection 3.4 of FIG. 32. Such first body 4 of FIG. 29 is used for the traditional methods of connection with the cap 2 of FIG. 33, i.e. ultrasonic welding and laser welding;

a second body 4B (better shown in FIG. 30), which is a body with a geometry with recess and tooth 4B.9 that goes to couple with the third cap 2B of FIG. 34 on which fastening geometries are obtained, equipped with an elongated end 4B BACK formed of a cylinder 4B.3, preferably placed perpendicularly with respect to the front cylinder 4B.2 of FIG. 30, where the geometries necessary in order to obtain the connecting and liquid-sealing element are obtained 4B.6 on the connecting nozzle with the container (not shown), and the anti-removal (anti-counterfeiting) sharp-edged fitting element 4B.5 with the container (not shown), preferably but not limited to the BIB.

Figure 13:
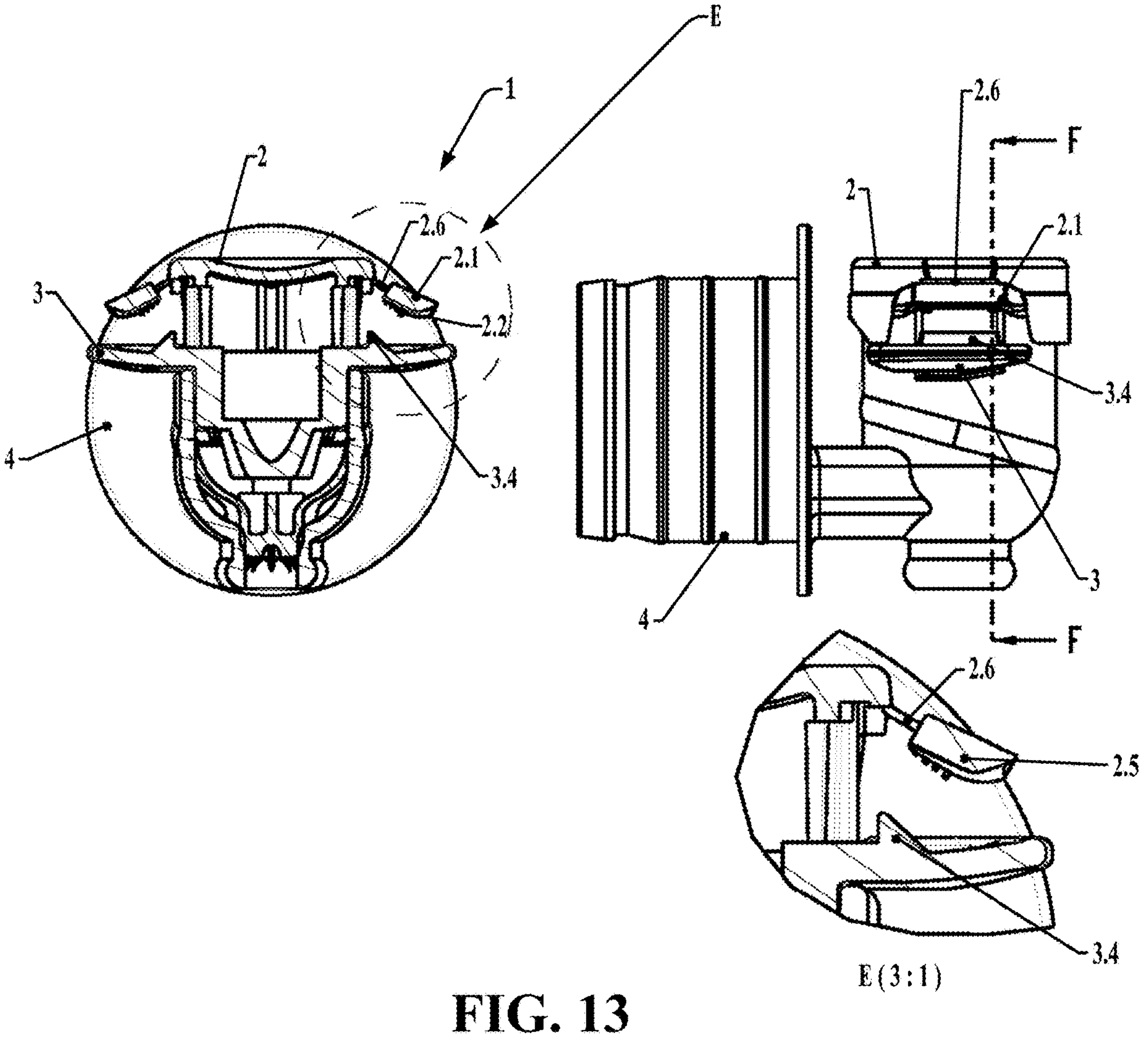
FIG. 13 is a front sectional, lateral and detailed view of the tap according to the present invention in a closing position after the first opening.
Figure 36:
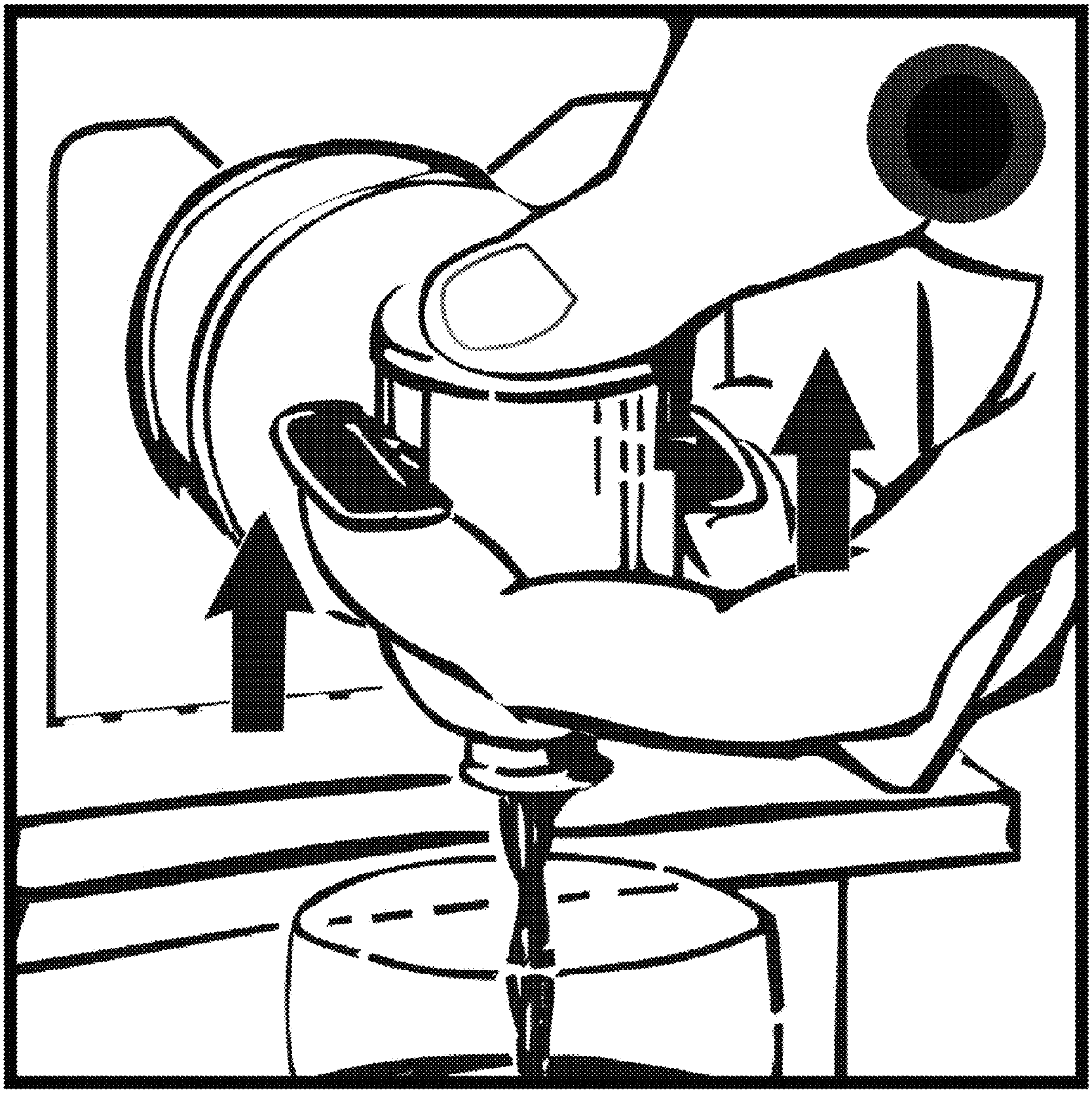
FIG. 36 is a stylized image at the time of the opening step (positioning of the fingers on the various components of the tap) of the tap currently on the market after having removed and disposed of the tamper evident band.

Frontally, there is a cylinder 4B.2, inside which the internal sealing wall 4B.4 and the internal sealing groove 4B.7 are obtained, which is coupled with the sealing circumference 5.1 and the vertical sealing wall 5.3 of the internal valve or membrane with elastic dome 5 of FIG. 31. On the front cylinder the seats 4B.8 are also obtained, which act as guide and seat of the driving projection 3.4 of FIG. 32. On such second body 4B the cavity-type and tooth-type fastening geometries 4B.9 are also obtained, used on the version of tap interlocking dispenser 1B of FIG. 37, exploiting the present interlocking geometries, precisely, on the second body 4B of FIG. 30 and on the third cap 2B of FIG. 34;

an internal valve or membrane with elastic dome 5 of FIG. 31 (in common for both versions 1 and 1B) comprising a fastening zone 5.4 inside the component, as shown in FIG. 31, a sealing recess 5.1 and a vertical sealing wall 5.3, which are operatively coupled by sealing the fluids with the internal geometries of the body 4, 4B, as will be seen later. The special dome-shaped geometry and the material used allow the particular internal valve or membrane with elastic dome 5 of FIG. 31 to be elastic and provide the tap 1, 1B with the particular feature of self-closing the valve 5, once having removed the external mechanical force applied by the user to the external flaps of the first driving element 3A2 of FIG. 32;

a driving end 3.2 (FIG. 32) which has the peculiarity of maintaining all the characteristics of the first element 3A used today for the tap in production, but with the addition (and therefore only a simple modification that allows the component to adapt to the new configuration of tap 1 of FIG. 1 and tap 1B of FIG. 37 by modifying the current production dies) of two driving projections or wedges 3.4 on the upper part of the external flaps 3.1, which guide the fins/flaps 2.1 obtained on the cap 2 (FIG. 33) and the geometry 2B.1 obtained on the third cap 2B (FIG. 34), allowing the opening (and simultaneously the breakage of the warranty seal) of the tap 1 of FIGS. 1 and 1B of FIG. 37. Further fastening geometries are present on the driving ends 3.2 and on the external flaps 3.1 of FIG. 32, useful to guarantee grasping areas of the fingers in order to allow opening the tap, as shown in FIG. 36. There are guiding and sliding geometries 3.5 coupling with the geometries 4.8 and 4B.8, obtained on the taps 1 and 1B respectively;

a cap 2 (better shown in FIG. 33), in the version to be used with the first body 4 of FIG. 29, useful for maintaining the fixing system between the two components (first body 4 and cap 2) using, as occurs today on the tap 1A currently on the market, to any welding method, preferably and not limited to, ultrasonic, with an integrated seal system that remains fastened to the cap 2 of FIG. 33, which in turn is stably bound to the first body 4, forming a single indivisible component, as required by the new European and international directive on disposable plastic articles (SUP). Referring to FIG. 33, it is possible to highlight the characteristics of the new cap 2 with tamper evident lateral fins/flaps 2.1 constrained to the body of the cap 2 by means of two flexible hinges 2.6 integrated to the cap 2, which have the function of maintaining the two tamper evident fins/flaps 2.1 constrained to the body of the cap 2, thus complying with the new European and international directives on disposable plastic items (SUP). There can also be jumper-type "thin" connecting elements 2.2, which bind the two lateral fins/flaps 2.1 to the body of the cap 2 in the middle of the fastening ring 2.8. These connecting jumpers break upon the first opening, due to the thrust of the driving projections or wedges 3.4 of FIG. 32 obtained on the driving element, and guarantee immediate visual feedback for the final customer who, seeing the side flaps raised as shown in FIG. 13, understands that the tap 1, 1B has already been opened, avoiding dangerous counterfeits for the final consumer. It is possible to notice, inside the fins/flaps 2.1 of FIG. 33, geometries also with an inclined plane 2.5, useful for coupling with the driving projections or wedges 3.4 of FIG. 32 obtained on the second driving element 3 of FIG. 32, and to allow the two lateral fins/flaps 2.1 of the seal to perform a rotation (guided by the coupled chutes 2.5): they are therefore useful to transform the lifting effort of the flaps 3.1 imposed by the user's fingers on the external flaps 3.1 of the driving element 3 (as shown in FIG. 36) into a torque of the fins/flaps 2.1 of FIG. 33 having as rotation center the connection of the connecting flap 2.6 of FIG. 33. There are further lateral escapes 2.7 (FIG. 33) next to the hinge 2.6, useful to allow getting a flexible hinge 2.6. There is also a concave seat 2.3 useful as seat of the opposable thumb, as shown in FIG. 36. There are guiding geometries 2.9 of the second driving element 3 of FIG. 32, and vertical geometries 2.4 useful, after the complete assembling of the tap 1, 1B, to keep the internal valve or membrane with elastic dome 5 in position thanks to the coupling with the upper plane 5.5 of the internal valve or membrane with elastic dome 5;

a third cap 2B (better shown in FIG. 34) in the version to be used with the second body 4B of FIG. 30 for an interlocking system between second body 4B and third cap 2B, with an integrated seal system that remains anchored to the cap, as required by the new European and international directive on disposable plastic items (SUP). Referring to FIG. 33, it is be possible to highlight the characteristics of the new third cap 2B with the tamper evident side fins/flaps 2B.1 constrained to the body of the third cap 2B by means of two flexible hinges 2B.6 integrated to the cap, which have the function of maintaining the tamper evident fins/flaps 2B.1 constrained to the body of the third cap 2B, thus complying with the new European and international directives on disposable plastic articles (SUP). There are also jumper-type "thin" connecting elements 2B.2, which bind the two lateral fins/flaps 2B.1 to the body of the third cap 2B by means of the fixed and stable fastening ring 2B.8. These connecting jumpers 2B.2 break upon the first opening, due to the thrust of the driving projections or wedges 3.4 of FIG. 32 obtained on the second driving element 3, and they guarantee immediate visual feedback for the final customer who, seeing the side flaps raised as shown in FIG. 13, understands that the tap 1, 1B has already been opened, avoiding dangerous counterfeits for the final consumer. Inside the fins/flaps 2B.1 of FIG. 34 there are geometries also with an inclined plane 2B.5, useful for coupling with the driving projections or wedges 3.4 of FIG. 32 obtained on the second driving element 3 of FIG. 32, and the two lateral flaps 2.1 of the seal of perform a rotation (guided by the coupled chutes 2B.5) and therefore they are useful to transform the lifting effort of the flaps 3.1 imposed by the user's fingers on the external flaps 3.1 of the second driving element 3 (as shown in FIG. 36) in a torque of the fins/flaps 2.1B of FIG. 34, having as rotation center the connection of the connecting flap 2.6 of FIG. 34. There are lateral escapes 2B.7 (FIG. 34) next to the hinge 2B.6 of FIG. 34, useful to allow obtaining a flexible hinge 2B.6. There is a concave seat 2B.3 of FIG. 34, useful as a seat of the opposable thumb and, preferably, also of the injection point of the material, as shown in FIG. 36. A guiding geometry 2B.9 of FIG. 34 is present for the second driving element 3 of FIG. 32. There are vertical geometries 2B.4, useful, after the complete assembling of the tap 1B, to keep the internal valve or membrane with elastic dome 5 in position due to the coupling with the upper plane 5.5 of the internal valve or membrane with elastic dome 5. Finally, there are two or more holes 2.10 of FIG. 34 on the upper part of the third cap 2B of FIG. 34, which allow obtaining the internal anchoring teeth 2.11 of FIG. 34, which then are stably coupled with the coupling profile obtained on the second body 4B of FIG. 30 (geometries 4B.9).

The two preferred embodiments of the invention are described: the "conservative" and cheaper and "faster" version to implement, which exploits the existing technologies of welding between two components (cap 2 of FIG. 33 and first body 4 of FIG. 29) and therefore allows re-using components of the solution currently in use, as well as the equipment that is used to make the components; and the new version, which instead exploits the connection between the two components (third cap 2B of FIG. 34 and second body 4B of FIG. 30), but of course they are susceptible to further modifications and variations within the same inventive idea.

Figure 3:
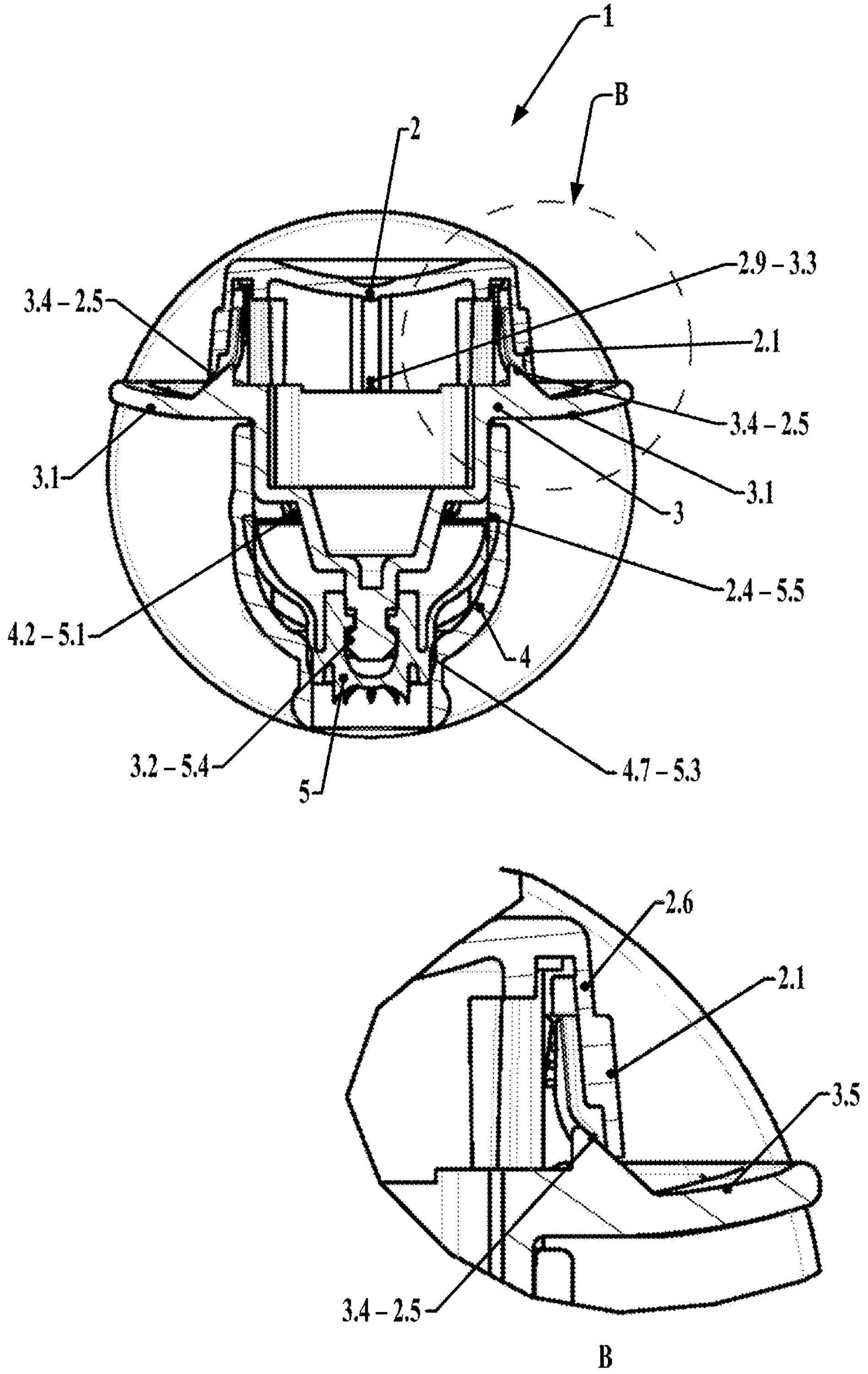
FIG. 3 is a front view and detailed section of an embodiment of the assembled tap according to the present invention in a closing position.
Figure 4:
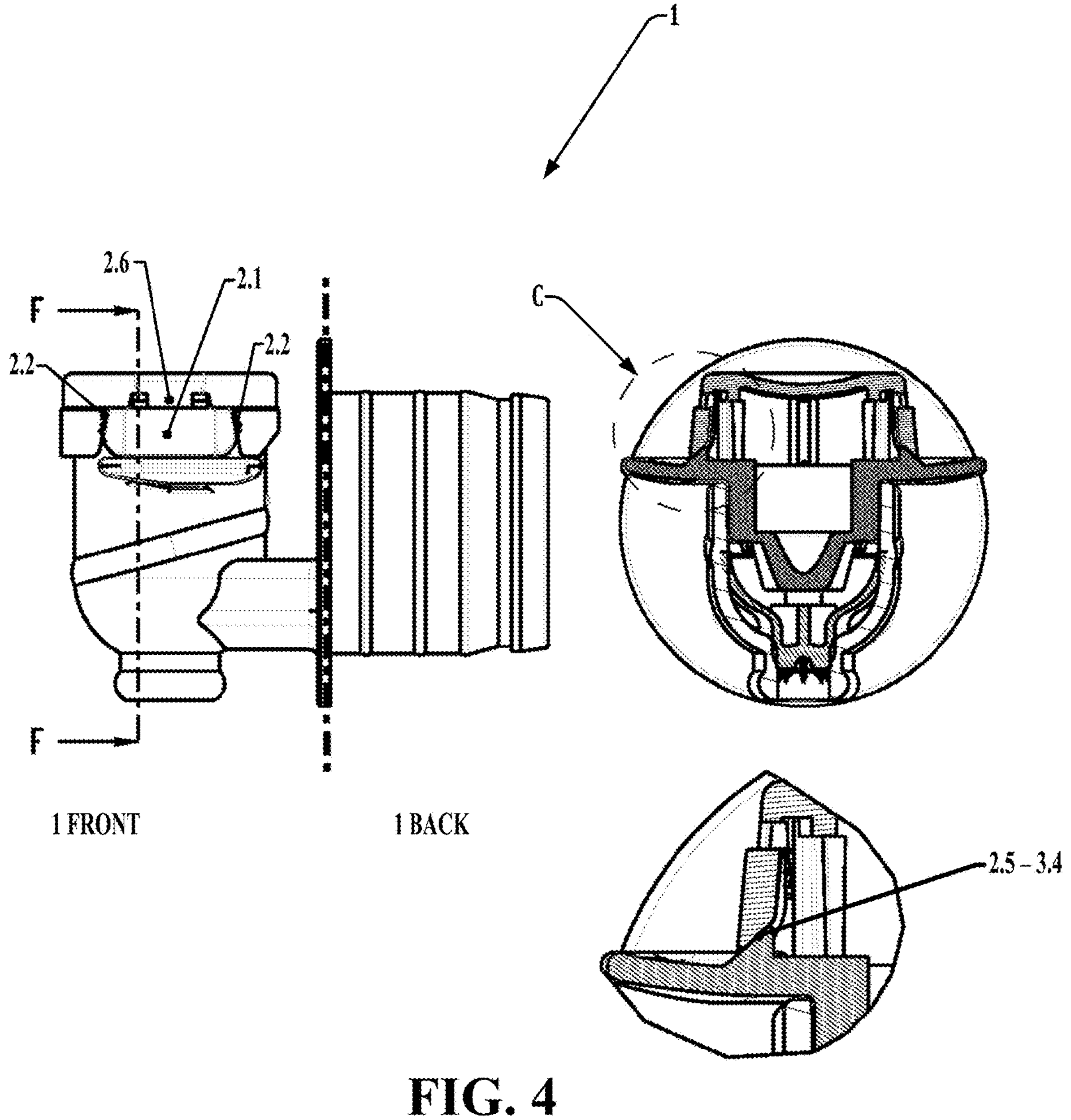
FIG. 4 is a front sectional view and a side view of an embodiment of the tap according to the present invention in a closing position.
Figure 5:
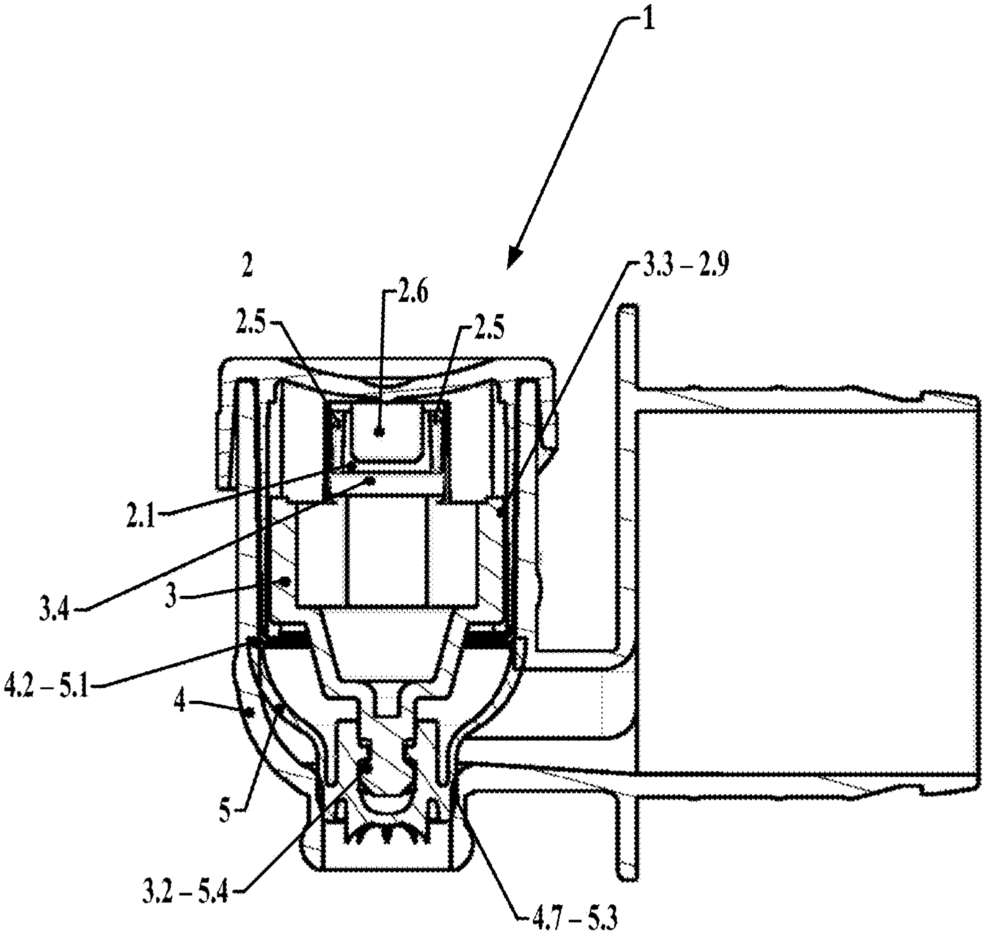
FIG. 5 is a side sectional view of an embodiment of the tap according to the present invention in a closing position.
Figure 6:
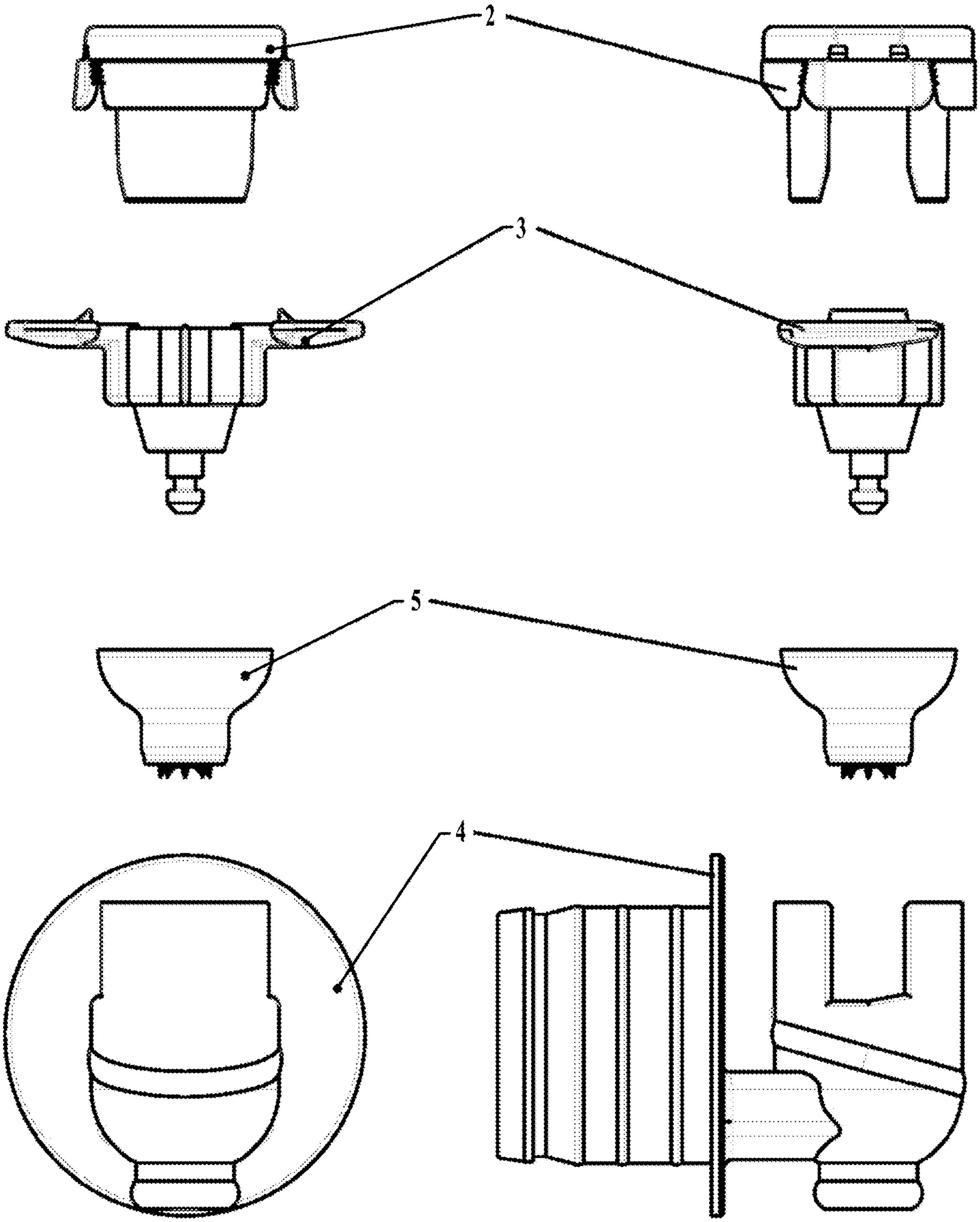
FIG. 6 is an exploded front and side view of an embodiment of the tap according to the present invention.
Figure 7:
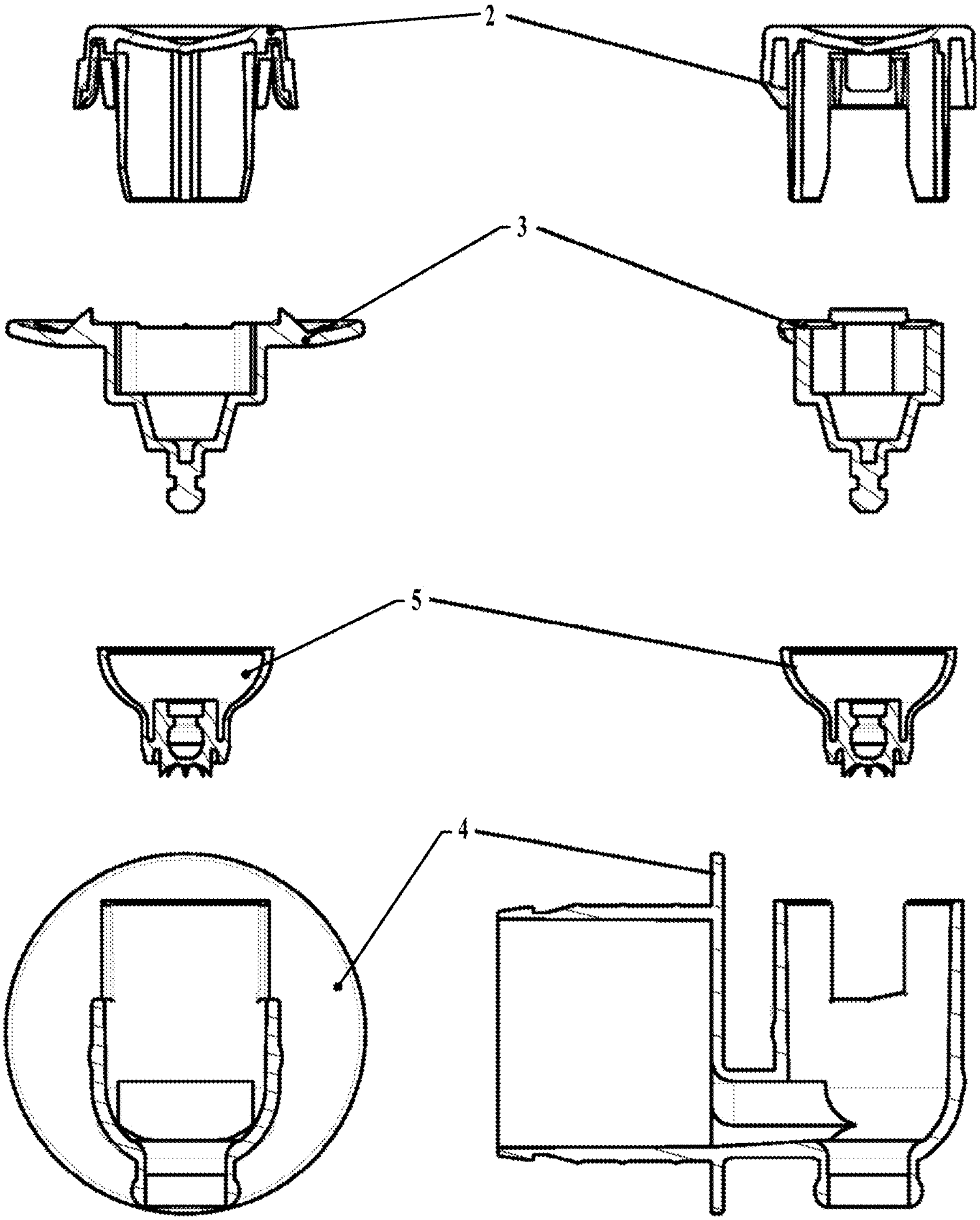
FIG. 7 is an exploded front and side sectional view of an embodiment of the tap according to the present invention.
Figure 8:
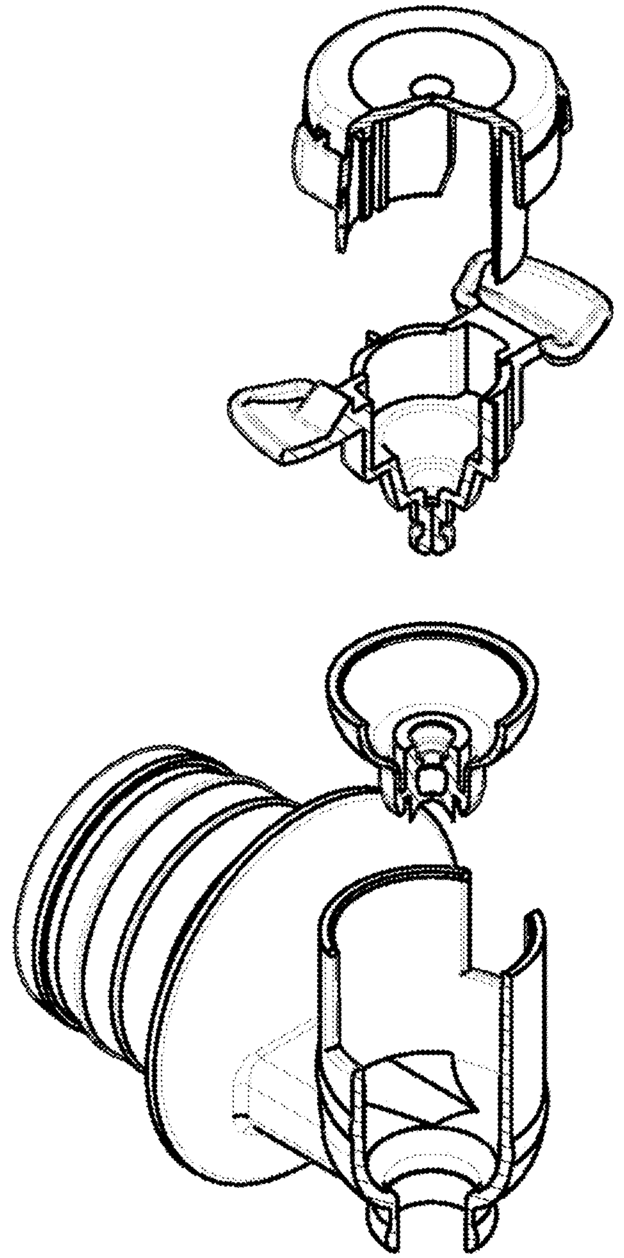
FIG. 8 is an isometric view in exploded section of the tap according to the present invention.

In particular, referring to FIG. 3, where the inventive tap 1 is highlighted in its traditional configuration (but such description is also perfectly associable with the inventive tap 1B of FIG. 37, with interlocking technology between third cap 2B and second body 4B) with cap 2 welded, preferably by ultrasound, on the first body 4, in section and in detail, in the closed position, it is noted that the internal valve or membrane with elastic dome 5, preferably made of flexible material with elastic memory, is inserted in the seat cylindrical front 4.2, obtained in the front part 4 FRONT of the first body 4 of FIG. 29, and goes in interference with the upper external surface of the sealing circumference 5.1 of the internal valve or membrane with elastic dome 5 of FIG. 31, generating the liquid-tightness (4.2-5.1 of FIG. 3), while the lower vertical sealing wall 5.3 of the internal valve or membrane with elastic dome 5 of FIG. 31, being in its closing position, is coupled with the internal surface of the liquid exit hole of the first body 4 (internal sealing groove 4.7 of FIG. 29) generating the lower seal on the liquid exit hole (internal sealing groove 4.7—vertical sealing wall 5.3 of FIG. 3).

Figure 11:
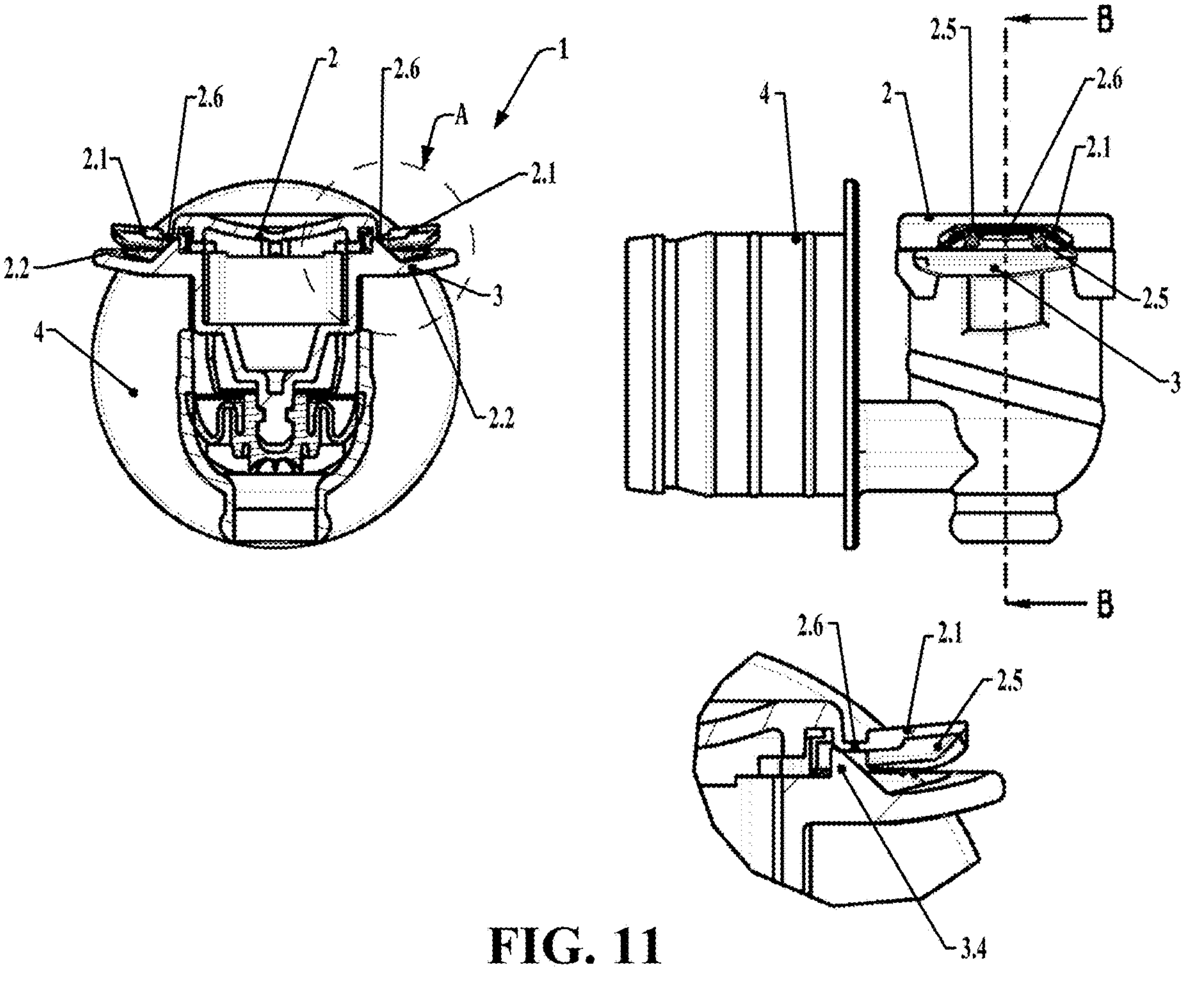
FIG. 11 is a front view, in section and in detail, of the tap according to the present invention in a first opening position.

Continuing to view FIG. 3, it is possible to note that, above the internal valve or membrane with elastic dome 5, the second driving element 3 of FIG. 32 is inserted (preferably interlocking and locking thanks to the geometries obtained on the two components, first body 4 and second driving element 3), going to lock stably due to the interlocking geometry obtained on its driving end 3.2 of FIG. 32 on the internal valve or membrane with elastic dome 5, due to its coupling (or interlocking) cavity 5.4 of FIG. 31, generating the stable coupling 3.2-5.4 which allows transmitting the opening force from the second driving element 3 of FIG. 3 to the internal valve or membrane with elastic dome 5 of FIG. 3, allowing the deformation as shown in FIG. 11, freeing the liquid exit hole 4.1 and enabling the delivery of liquid contained inside the container, preferably but not limited, to BIB.

Continuing in the analysis, as the last component forming the new inventive tap 1 and 1B (in its alternative configuration), the cap with integrated seal, no longer removable, is inserted inside the front part of the first body 4 of FIG. 3, as required by the EU and international directives on single-use plastic articles (SUP). It should be noted that the component cap 2 of FIGS. 33 and 2B of FIG. 34 (in this case together with the second body 4B of FIG. 30) and the second driving element 3 of FIG. 32 represent the real innovation that allows adapting to the existing market quickly and economically, especially as regards the version of tap 1 of FIG. 1 and following, which requires only a "reconstructed" component, i.e. the most innovative and sought-after one (the cap 2), while for the second driving element 3 of FIG. 32 it is enough to simply modify the existing equipment by adding, preferably but not limited to, the driving projections or wedges of opening 3.4 of FIG. 32 to obtain the coupling groove 4.9B of FIG. 30 that works with the undercut 2.11 of FIG. 34 created on the cap).

More specifically, referring to FIG. 33, as regards the "traditional" version shaped to be welded on the first body 4 of FIG. 29, it is possible to note the lateral tamper evident fins/flaps 2.1 which is constrained to the main body of the cap 2 of FIG. 33 by means of fins/flaps or jumpers 2.1 and of a flexible hinge 2.6 of FIG. 33. Preferably, the jumpers 2.2 of FIG. 33 have the purpose of keeping the flaps of the second driving element 3 closed when the tap is sealed and it has not to be opened, and this guarantees the end user that the product contained inside the container to which the inventive tap 1, 1B is connected, preferably to a BIB, has not suffered counterfeits and/or first openings. The second function that the jumpers 2.2 have is that of allowing the fins/flaps 2.1 of the cap 2 to free themselves laterally, remaining only constrained by the middle of the two hinges 2.6 (one on each side) of FIG. 33, breaking due to the torque-type movement imposed on the fins/flaps 2.1 of FIG. 33 by the second driving element 3 of FIG. 32 due to its driving projections or wedges 3.4 of FIG. 32, which cooperate with the internal geometries 2.5 that are found inside the flaps 2.1 of the cap 2, which have the purpose of transforming a translational movement of the second driving element 3 of FIG. 32 into a torque-like movement during the first and the subsequent opening.

Preferably, there are annular, rigid and fixed fixing areas 2.8 (FIG. 33) which serve as external guides and above all as a base for the connection of the jumpers 2.2 of the tamper evident seals, guaranteeing the rigidity necessary to withstand any stress of unwanted opening, discharged on the flaps 3.6 of FIG. 32 of the second driving element 3 of FIG. 32, and consequently on the two tamper evident fins/flaps 2.1 of the cap 2 of FIG. 33. The sizes of the jumpers 2.2 of FIG. 33 allow to better manage the opening strength that is guaranteed to the final customer.

Continuing in the description, it is possible to note, on the upper part of the cap 2, a trap 2.3 (FIG. 33) which acts as seat for the opposable thumb when opening the inventive tap 1, 1B, as shown in the image of FIG. 36, and also for the hidden location of the injection point of the plastic material. Preferably two elongated geometries 2.10 are obtained therein, which act, once assembled the inventive tap 1, 1B, as sliding seat of the second driving element 3 of FIG. 32 due to tracks 2.9 obtained inside them (FIG. 33) in which the protrusions 3.3 of FIG. 32 of the second driving element 3 slide, ensuring linear sliding and guiding. The extensions 2.10 have also the purpose of keeping the internal valve or membrane with elastic dome 5 of FIG. 31 in position, due to the flat surfaces 2.4 of FIG. 33 which rest on the flat surface 5.5 of FIG. 31 of the internal valve or membrane with elastic dome 5. As for the second version 1B of the inventive tap, the description made above is almost the same. The substantial differences are that, on the cap 2B of FIG. 34, fastening geometries 2B.11 are obtained, which are coupled with the seat 4B.9 obtained on the second body 4B of FIG. 30, generating a stable coupling comparable to the welding between the two components. The holes obtained, preferably on the upper part, serve to obtain in a simple way (at the level of mold conformation that produces the third cap 2B of FIG. 34) the internal teeth 2.11 of FIG. 34.

The other difference is on the second body 4B where, as previously stated, the fastening seats 4B.9 of FIG. 30 of the teeth 2B.11 of FIG. 34 are obtained.

As for the rest, what is described hereafter is valid both for the inventive tap 1 of FIG. 1 and for that 1B of FIG. 37.

Figure 2:
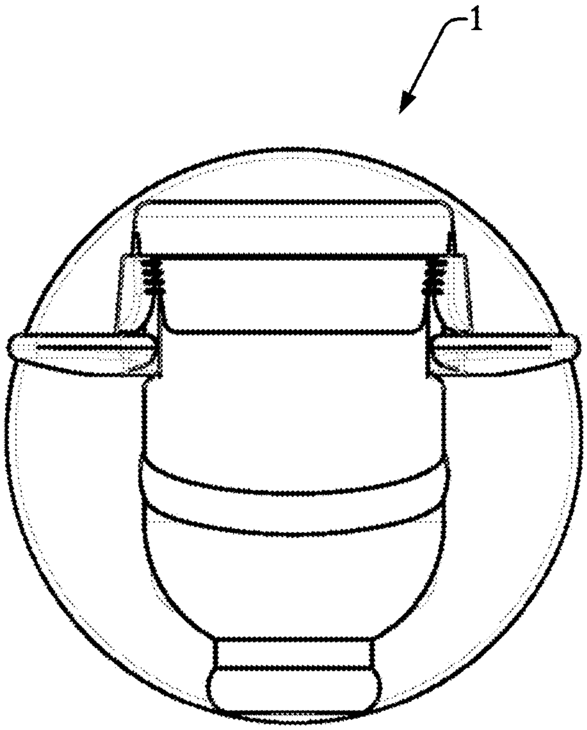
FIG. 2 is a front view of an embodiment of the tap according to the present invention in a closing position.

Preferably, referring to FIGS. 1, 2 and 3, it is possible to note the inventive tap 1 (for the interlocking solution 1B the FIG. 37 must be referred to) in its closing position and with the tamper evident sealing fins/flaps 2.1 closed as a guarantee of the final consumer. As can be seen from FIGS. 3 and 4, the driving projections or wedges 3.4 rest on the guiding ribs of the tamper evident 2.5 and are ready at any time to transmit the opening force, and transform the ascending movement of the second driving element 3 in a torque movement of the lateral fins/flaps 2.1, of the cap 2, which allow breaking the jumpers and consequently the rising movement of the second driving element 3 which, being bound to the internal valve or membrane with elastic dome 5 by means of fastening geometries, allow the opening of the tap and the delivery of the fluid contained in the container, preferably a BIB.

Figure 9:
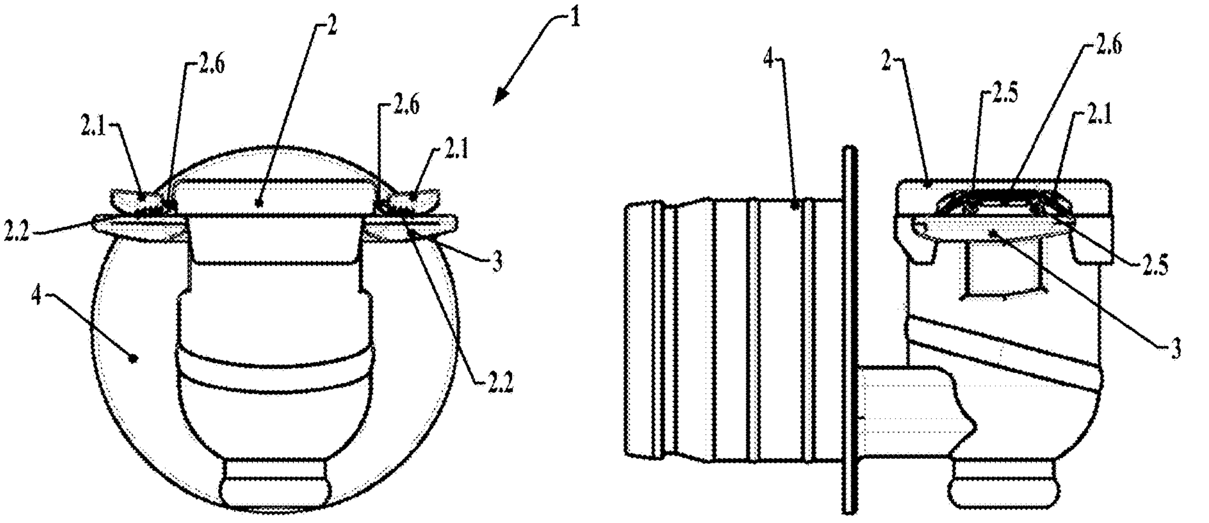
FIG. 9 is a front side view of the tap according to the present invention in a first opening position.
Figure 10:
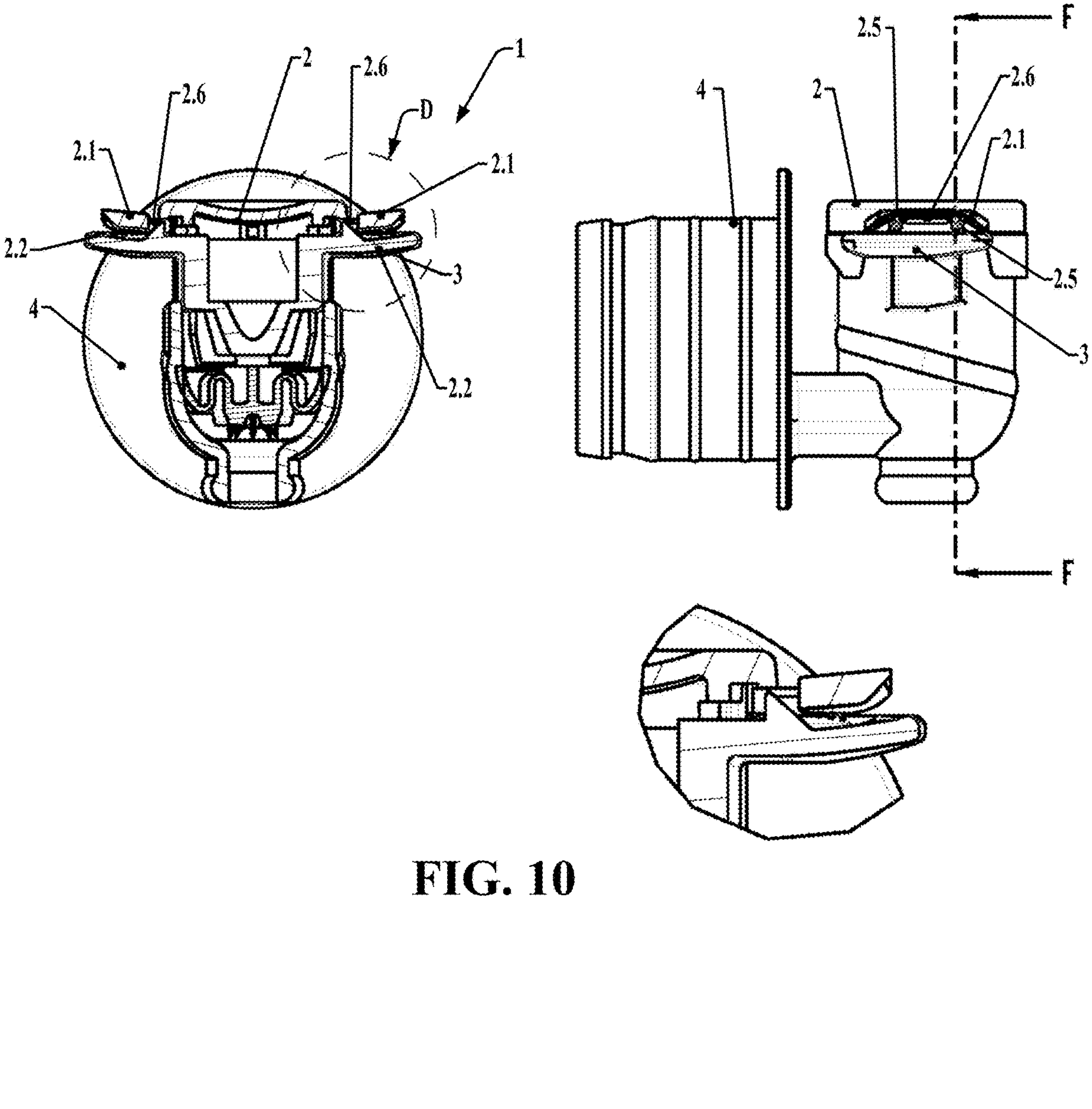
FIG. 10 is a front side sectional view, in detail, of the tap according to the present invention in an opening position.

On FIGS. 9, 10 and 11, it is possible to note what happens during the first opening of the inventive tap 1, 1B, where the second driving element 3 has finished its run, due to the action of the fingers and of the opposable thumb, as highlighted in FIG. 36, and the tamper evident fins/flaps 2.1 are in the fully open position. The main feature of these flaps is that they have been obtained on a single part, and that, due to the hinge-type geometries 2.6 obtained all in a single piece, they guarantee that the tamper evident fins/flaps 2.1 remain constrained to the body of the cap 2, and therefore even after the breakage of the jumpers 2.2, remain constrained round and are not dispersed into the environment, allowing the application to comply with the new European and international directives on single-use plastic articles (SUP).

Figure 12:
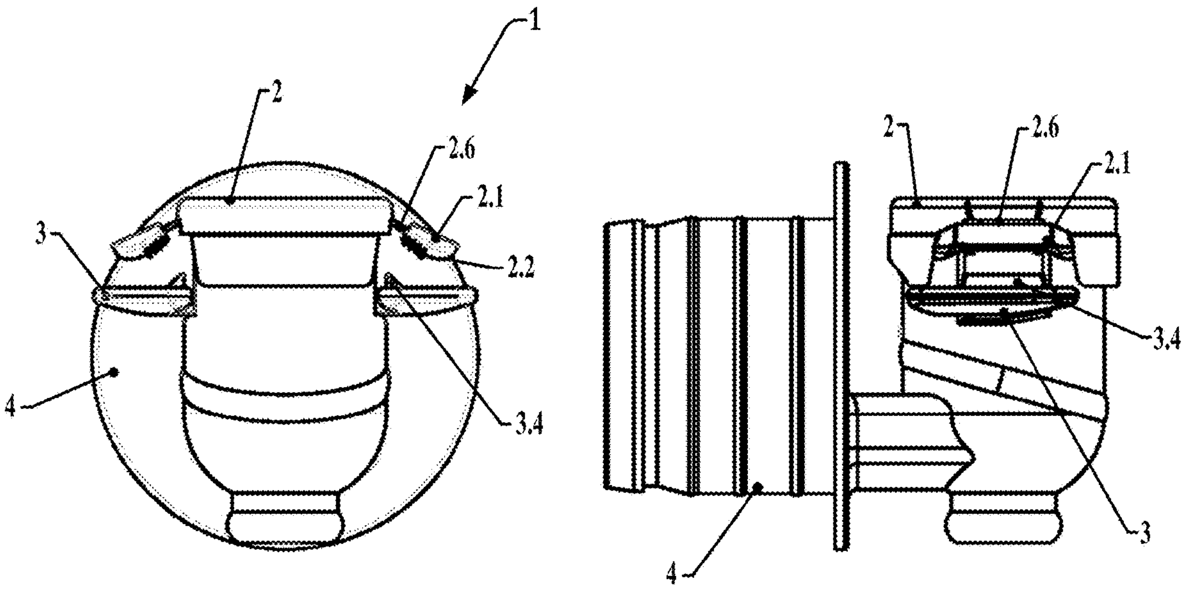
FIG. 12 is a front side view of the tap according to the present invention in a closing position closing after the first opening.
Figure 14:
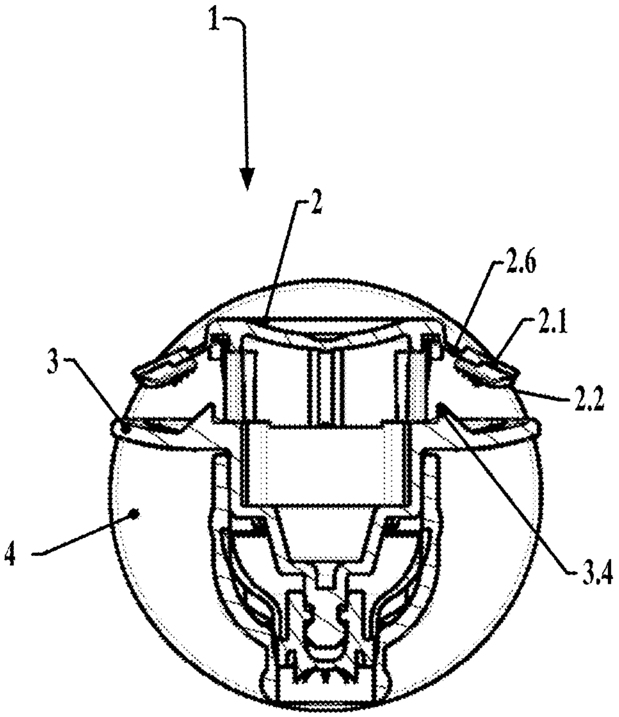
FIG. 14 is a sectional front view of the tap according to the present invention in a closing position after the first opening.

Finally, FIGS. 12, 13 and 14 highlight the situation after the fingers cease the traction action imposed on the flaps 3.6 of the second driving element 3. Due to the internal valve or membrane with elastic dome 5, the whole system returns to its starting position shown in FIGS. 12, 13 and 14, but it is highlighted (tamper evident) that the tap 1, 1B was opened the first time, thanks to the position of the tamper evident fins/flaps 2.1 which remain raised and bound by the cap 2 with the broken jumpers 2.2, immediately giving visual evidence to the end customer.

The invention claimed is:

1. A tamper-preventing liquid-dispensing tap with automatic opening comprising:

a containing body;

a internal valve or membrane with elastic dome contained in said containing body;

a driving element contained in and operatively coupled with said internal valve or membrane with elastic dome; and a cap equipped with integrated sealing elements which remain fastened to the cap, said cap being placed above and stably constrained to said containing body forming a single component which cannot be divided, said cap being further operatively coupled with said driving element;

wherein said driving element is designed to be driven by said cap to allow opening and simultaneous breakage of the sealing elements of the tap.

2. The tap according to claim 1, characterized in that said containing body is equipped with:

an elongated end formed of a cylinder configured to perform an interference coupling with a container of liquids and having a removal-preventing and counterfeit-preventing element with sharped edge for fitting with the container of liquids, said elongated end being placed perpendicular with respect to a front cylinder containing an internal sealing wall and an internal sealing groove designed to be coupled with a sealing circumference and a vertical sealing wall of said internal valve or membrane with elastic dome, said front cylinder being further equipped with seats designed to operate as a guide and seat for driving projections of said driving element.

3. The tap according to claim 1, characterized in that said cap is equipped with:

two tamper evident lateral fins/flaps constrained to a body of the cap by two connecting flaps configured to keep the two tamper evident lateral fins/flaps constrained to the body of the cap;

connecting jumpers designed to constrain the two tamper evident lateral fins/flaps to the body of the cap with a fastening ring, said connecting jumpers being designed to be broken upon the opening of the tap due to a thrust of driving projections of said driving element, wherein the driving projections are disposed on external flaps of the driving element;

chute elements contained inside the two tamper evident lateral fins/flaps and designed to be coupled with said driving projections of said driving element and to allow the two tamper evident lateral fins/flaps of the cap to perform a rotation, guided by the coupled chute elements, to transform a lifting effort imposed on the external flaps of the driving element into a torque of the two tamper evident lateral fins/flaps, having as rotation centers, connections of the two connecting flaps;

lateral escapes placed next to the two connecting flaps configured to provide flexibility to the two connecting flaps;

a concave seat configured as a seat for an opposable thumb;

guiding elements for the driving element; and vertical geometries designed, after assembly of the tap, to keep in position the internal valve or membrane with elastic dome due to a coupling with an upper plane of the internal valve or membrane with elastic dome.

4. The tap according to claim 1, characterized in that said containing body comprises a front cylinder and an elongated end formed of a cylinder, placed perpendicular with respect to the front cylinder, said elongated end being designed to connect with a container of liquids and comprises a removal-preventing and counterfeit-preventing fitting element with sharped edge, said front cylinder having a recess and a tooth configured to couple with the cap, and containing therein an internal sealing wall and an internal sealing groove designed to be coupled with a sealing circumference and a vertical sealing wall of the internal valve or membrane with elastic dome, said front cylinder being further equipped with guiding and containing seats for driving projections of the driving element.

5. The tap according to claim 4, characterized in that said cap is equipped with:

two tamper evident side fins/flaps constrained to a body of the cap by two integrated flexible hinges;

connecting jumpers designed to constrain the two tamper evident side fins/flaps to the body of the cap with a fixed and stable fastening ring, said connecting jumpers being designed to be broken upon the opening due to a thrust of the driving projections of the driving element, wherein the driving projections are disposed on external flaps of the driving element;

chute elements placed inside the two tamper evident side fins/flaps and designed to be coupled with the driving projections of the driving element, and to allow the two tamper evident side fins/flaps of the cap to perform a rotation, guided by the coupled chute elements, and designed to transform a lifting effort imposed on the external flaps of the driving element in a torque of the two tamper evident side fins/flaps, having as rotation centers, connections of the two integrated flexible hinges;

lateral escapes next to the two integrated flexible hinges, designed to allow flexibility of the two integrated flexible hinges;

a concave seat configured as seat for an opposable thumb;

guiding elements for the driving element;

vertical geometries designed, after assembly of the tap, to keep in position the internal valve or membrane with elastic dome due to a coupling with an upper plane of the internal valve or membrane with elastic dome; and two or more holes on an upper part of the cap and internal fastening teeth configured to couple with the recess and tooth of the front cylinder of the containing body.

6. The tap according to claim 1, characterized in that said driving element is equipped with:

at least two external flaps and driving projections on an upper part of the at least two external flaps, designed to guide tamper evident fins/flaps obtained on the cap, allowing the opening and simultaneous breakage of the sealing elements of the tap;

grasping surfaces on a lower part of the at least two external flaps configured for fingers of a user in order to allow the opening of the tap;

a driving end configured to couple the driving element to the internal valve or membrane with elastic dome; and guiding and sliding elements configured to couple with corresponding seats of the containing body.

7. The tap according to claim 1, characterized in that said internal valve or membrane with elastic dome comprises an internal fastening area, a sealing recess and a vertical sealing wall, designed to be operatively coupled, making a seal to fluids, with an internal surface of the containing body.

* * * * *